United States Patent
Ji et al.

(10) Patent No.: US 12,477,539 B2
(45) Date of Patent: Nov. 18, 2025

(54) SIDELINK RESOURCE MAPPING METHOD, SIDELINK RESOURCE TRANSMISSION METHOD, NETWORK DEVICE, AND TERMINAL DEVICE

(71) Applicant: VIVO MOBILE COMMUNICATION CO., LTD., Guangdong (CN)

(72) Inventors: Zichao Ji, Chang'an Dongguan (CN); Xueming Pan, Chang'an Dongguan (CN); Huaming Wu, Chang'an Dongguan (CN); Shuyan Peng, Chang'an Dongguan (CN); Siqi Liu, Chang'an Dongguan (CN); Shixiao Liu, Chang'an Dongguan (CN); Wei Jiang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 610 days.

(21) Appl. No.: 17/667,500

(22) Filed: Feb. 8, 2022

(65) Prior Publication Data
US 2022/0167340 A1 May 26, 2022

Related U.S. Application Data

(63) Continuation of application No. PCT/CN2020/107052, filed on Aug. 5, 2020.

(30) Foreign Application Priority Data

Aug. 9, 2019 (CN) .......................... 201910736259.5

(51) Int. Cl.
*H04W 72/20* (2023.01)
(52) U.S. Cl.
CPC .................................. *H04W 72/20* (2023.01)

(58) Field of Classification Search
CPC ... H04W 72/20; H04W 4/40; H04W 72/0446; H04W 72/0453; H04W 72/23;
(Continued)

(56) References Cited

U.S. PATENT DOCUMENTS

| | | | |
|---|---|---|---|
| 2017/0188320 A1 | 6/2017 | Xiong et al. | |
| 2018/0035427 A1 | 2/2018 | Gupta et al. | |

(Continued)

FOREIGN PATENT DOCUMENTS

| | | |
|---|---|---|
| CN | 107734704 A | 2/2018 |
| CN | 108347313 A | 7/2018 |

(Continued)

OTHER PUBLICATIONS

First Office Action for Korean Application No. 10-2022-7005915, dated Jan. 19, 2024, 5 Pages.

(Continued)

*Primary Examiner* — Eric Myers
(74) *Attorney, Agent, or Firm* — BROOKS KUSHMAN P.C.

(57) ABSTRACT

A sidelink resource mapping method, a sidelink resource transmission method, a network device, and a terminal device are provided. The method includes: obtaining a group of PSFCH resources corresponding to each physical sidelink transmission channel resource in a group of physical sidelink transmission channel resources, where the physical sidelink transmission channel resource includes a PSSCH resource and/or a PSCCH resource; setting an index number for each physical sidelink transmission channel resource in the group of physical sidelink transmission channel resources according to a first preset order of a first resource factor; setting index numbers for the group of PSFCH resources according to a second preset order of a second resource factor; and configuring a mapping relationship (Continued)

between index numbers of the physical sidelink transmission channel resources and index numbers of PSFCH resources corresponding to the physical sidelink transmission channel resources.

18 Claims, 5 Drawing Sheets

(58) Field of Classification Search
CPC .. H04W 72/0466; H04L 5/001; H04L 5/0044; H04L 5/0053; H04L 1/1861; H04L 5/0055; H04L 1/1607
See application file for complete search history.

(56) References Cited

U.S. PATENT DOCUMENTS

| | | |
|---|---|---|
| 2019/0007974 A1 | 1/2019 | Nguyen |
| 2019/0090220 A1 | 3/2019 | Li et al. |
| 2019/0349895 A1 | 11/2019 | Liu |
| 2021/0321380 A1 | 10/2021 | Zhao |
| 2022/0030598 A1 | 1/2022 | Li |
| 2022/0132471 A1* | 4/2022 | Hwang ................ H04W 72/20 |
| 2022/0201654 A1 | 6/2022 | Lee et al. |

FOREIGN PATENT DOCUMENTS

| | | |
|---|---|---|
| CN | 108476390 A | 8/2018 |
| CN | 109691146 A | 4/2019 |
| CN | 109792594 A | 5/2019 |
| EP | 3 954 076 A1 | 2/2022 |
| RU | 2670792 C9 | 11/2018 |
| WO | 2014/154085 A1 | 10/2014 |
| WO | 2016078905 A1 | 5/2016 |
| WO | 2020/210333 A1 | 10/2020 |

OTHER PUBLICATIONS

CATT "Discussion on physical layer procedures for sidelink in NR V2X" 3GPP TSG RAN WG1 Meeting #96bis, Xi'an, China, Apr. 2019, R1-1905356, 4 Pages.
LG Electronics "Discussion on physical layer procedures for NR sidelink" 3GPP TSG RAN WG1 Meeting #96 bis, Xi'an, China, Apr. 2019, R 1 1905443, 12 Pages.
LG Electronics "Feature lead summary #2 for agenda item 7.2.4.5 Physical layer procedures for sidelink" 3GPP TSG RAN WG1 #96 bis, Xi'an, China, Apr. 2019, R1 1905892, 23 Pages.
First Office Action for Singapore Application No. 11202201187Y, dated Mar. 4, 2024, 10 Pages.
Spreadtrum Communications, "Discussion on NR sidelink physical layer procedure," 3GPP TSG RAN WG1 Ad-Hoc Meeting 1901, R1-1900714, pp. 1-6, (Jan. 21-25, 2019).
Huawei et al., "PSFCH formats for NR V2X," 3GPP TSG RAN WG1 Meeting #96bis, R1-1905899, pp. 1-5, (Apr. 8-12, 2019).
Huawei et al., "Sidelink physical layer structure for NR V2X," 3GPP TSG RAN WG1 Meeting #97, R1-1906007, pp. 1-18, (May 13-17, 2019).
IN Office Action dated Aug. 18, 2022 as received in Application No. 202227012213.
Extended European Search Report dated Sep. 6, 2022 as received in Application No. 20852480.1.
RU Office Action dated Oct. 12, 2022 as received in Application No. 2022106059/07.
Chinese Office Action dated Jan. 18, 2021 as received in application No. 201910736259.5.
"On Mode 2 Resource allocation in NR V2X" 3GPP TSG RAN WG1 Meeting #97 R1-1906316 Reno, USA, May 13-17, 2019, CATT.
"Discussion on sidelink resource allocation mechanism" 3GPP TSG RAN WG1 #97 R1-1906515 Reno, USA, May 13-17, 2019, CMCC.
"Discussion on HARQ feedback for NR V2X" 3GPP TSG RAN WG1 #97, R1-1906519, May 13, 2019, CMCC.
"Design and contents of PSCCH and PSFCH" 3GPP TSG RAN WG1 Meeting #97 R1-1906596, Reno, USA, May 13-17, 2019, Huawei, HiSilicon.
"Discussion on physical layer procedures for NR sidelink" 3GPP TSG RAN WG1 Meeting #97, R1-1907018, May 13, 2019, LG Electronics.
AT&T., "Physical layer procedures for NR sidelink design," 3GPP TSG RAN WG1 #96, R1-1901896, pp. 1-7, (Feb. 26, 2019).
IP Office Action dated Apr. 11, 2023 as received in Application No. 2022-507785.

* cited by examiner

SIDELINK RESOURCE MAPPING METHOD, SIDELINK RESOURCE TRANSMISSION METHOD, NETWORK DEVICE, AND TERMINAL DEVICE

CROSS-REFERENCE TO RELATED APPLICATIONS

This disclosure is continuation application of PCT International Application No. PCT/CN2020/107052 filed on Aug. 5, 2020, which claims priority to Chinese Patent Application No. 201910736259.5, filed in China on Aug. 9, 2019, the disclosures of which are incorporated herein by reference in their entireties.

TECHNICAL FIELD

Embodiments of this disclosure relate to the field of communications technologies, and in particular, to a sidelink resource mapping method, a sidelink resource transmission method, a network device, and a terminal device.

BACKGROUND

Vehicle-to-everything (Vehicle to X, V2X) information exchange is one of key technologies of a future intelligent transportation system. Currently, V2X applications may include vehicle-to-vehicle (V2V), vehicle-to-infrastructure (V2I), vehicle-to-pedestrian (V2P), and vehicle-to-network (V2N).

To add acknowledge (ACK) feedback information or non-acknowledge (NACK) feedback information to sidelink (SL), new radio (NR) V2X supports a new SL channel: a physical sidelink feedback channel (PSFCH). In a case that a terminal device transmits feedback information on a PSFCH resource, collision is very likely to occur on a PSFCH resource on which a plurality of pieces of feedback information are transmitted.

SUMMARY

According to a first aspect, an embodiment of this disclosure provides a sidelink resource mapping method, applied to a network device. The method includes: obtaining a group of physical sidelink feedback channel PSFCH resources corresponding to each physical sidelink transmission channel resource in a group of physical sidelink transmission channel resources, where the physical sidelink transmission channel resource includes a physical sidelink shared channel PSSCH resource and/or a physical sidelink control channel PSCCH resource; setting an index number for each physical sidelink transmission channel resource in the group of physical sidelink transmission channel resources according to a first preset order of a first resource factor; setting index numbers for the group of PSFCH resources according to a second preset order of a second resource factor; and configuring a mapping relationship between index numbers of the physical sidelink transmission channel resources and index numbers of PSFCH resources corresponding to the physical sidelink transmission channel resources.

According to a second aspect, an embodiment of this disclosure provides a sidelink resource transmission method, applied to a terminal device. The method includes: based on an index number of a target physical sidelink transmission channel resource, obtaining from a preset mapping relationship an index number of a physical sidelink feedback channel PSFCH resource that corresponds to the index number of the target physical sidelink transmission channel resource; and transmitting feedback information on a target PSFCH resource, where the index number of the PSFCH resource that corresponds to the index number of the target physical sidelink transmission channel resource includes an index number of the target PSFCH resource. The preset mapping relationship includes a preconfigured mapping relationship between index numbers of PSFCH resources and index numbers of physical sidelink transmission channel resources. The index numbers of the physical sidelink transmission channel resources are set according to a first preset order of a first resource factor. The index numbers of the PSFCH resources are set according to a second preset order of a second resource factor. The target physical sidelink transmission channel resource is a physical sidelink transmission channel resource corresponding to the received information.

According to a third aspect, an embodiment of this disclosure provides a network device, including: an obtaining module, configured to obtain a group of physical sidelink feedback channel PSFCH resources corresponding to each physical sidelink transmission channel resource in a group of physical sidelink transmission channel resources, where the physical sidelink transmission channel resource includes a physical sidelink shared channel PSSCH resource and/or a physical sidelink control channel PSCCH resource; a first setting module, configured to set an index number for each physical sidelink transmission channel resource in the group of physical sidelink transmission channel resources according to a first preset order of a first resource factor; a second setting module, configured to set index numbers for the group of PSFCH resources according to a second preset order of a second resource factor; and a configuration module, configured to configure a mapping relationship between index numbers of the physical sidelink transmission channel resources and index numbers of PSFCH resources corresponding to the physical sidelink transmission channel resources.

According to a fourth aspect, an embodiment of this disclosure provides a terminal device, including: a search module, configured to, based on an index number of a target physical sidelink transmission channel resource, obtain from a preset mapping relationship an index number of a physical sidelink feedback channel PSFCH resource that corresponds to the index number of the target physical sidelink transmission channel resource; and a feedback module, configured to transmit feedback information on a target PSFCH resource, where the index number of the PSFCH resource that corresponds to the index number of the target physical sidelink transmission channel resource includes an index number of the target PSFCH resource. The preset mapping relationship includes a preconfigured mapping relationship between index numbers of PSFCH resources and index numbers of physical sidelink transmission channel resources. The index numbers of the physical sidelink transmission channel resources are set according to a first preset order of a first resource factor. The index numbers of the PSFCH resources are set according to a second preset order of a second resource factor. The target physical sidelink transmission channel resource is a physical sidelink transmission channel resource corresponding to the received information.

According to a fifth aspect, an embodiment of this disclosure provides a network device, including a processor, a memory, and a computer program stored in the memory and capable of running on the processor, where when the computer program is executed by the processor, the steps of the sidelink resource mapping method in the technical solution of the first aspect are implemented.

According to a sixth aspect, an embodiment of this disclosure provides a terminal device, including a processor, a memory, and a computer program stored in the memory and capable of running on the processor, where when the computer program is executed by the processor, the steps of the sidelink resource transmission method in the technical solution of the second aspect are implemented.

According to a seventh aspect, an embodiment of this disclosure provides a computer-readable storage medium, where the computer-readable storage medium stores a computer program, and when the computer program is executed by a processor, the steps of the sidelink resource mapping method in the technical solution of the first aspect are implemented, or the steps of the sidelink resource transmission method in the technical solution of the second aspect are implemented.

BRIEF DESCRIPTION OF DRAWINGS

This disclosure can be better understood in the following descriptions of specific implementations of this disclosure with reference to the accompanying drawings. The same or similar reference signs indicate the same or similar features.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of this disclosure.

The embodiments of this disclosure provide a sidelink resource mapping method, a sidelink resource transmission method, a network device, and a terminal device, which are applied to a scenario in which a physical sidelink feedback channel (PSFCH) resource is used to transmit acknowledge (ACK) feedback information or non-acknowledge (NACK) feedback information.

In some examples, three channel formats may be selected for a PSFCH as alternatives. A first channel format may be a sequence-based (sequence based) short feedback channel format (short PSFCH format). A second channel format may be a sequence-based long feedback channel format (long PSFCH format). A third channel format may be a bearer information bit-based short feedback channel format.

Sidelink can support unicast transmission, groupcast (groupcast) transmission, and broadcast transmission. The unicast transmission and the groupcast transmission support a sidelink hybrid automatic repeat request (SL HARQ). For the unicast transmission, a terminal device feeds back ACK feedback information or NACK feedback information on a PSFCH resource. For the groupcast transmission, at least two feedback manners are included. For example, in a first feedback manner, all terminal devices share a PSFCH resource, and the terminal devices feed back only NACK feedback information. In a second feedback manner, terminal devices occupy different PSFCH resources, and the terminal devices feed back ACK feedback information or NACK feedback information on their respective PSFCH resources.

In the embodiments of this disclosure, a network device may set an index number for a PSSCH resource and/or a PSCCH resource corresponding to a PSFCH resource, set an index number for the PSFCH resource, and configure a mapping relationship between the index number of the PSFCH resource and the index number of the corresponding PSSCH resource and/or PSCCH resource. This is equivalent to configuring a mapping relationship between the PSFCH resource and the corresponding PSSCH resource and/or PSCCH resource. By using the configured mapping relationship, a terminal device transmits feedback information on a corresponding PSFCH resource in the mapping relationship based on a PSSCH resource and/or a PSCCH resource corresponding to received information.

In the embodiments of this disclosure, the network device may be a device such as a base station or a control node. This is not limited herein. The terminal device may be specifically user equipment (UE). This is not limited herein.

Figure 1:
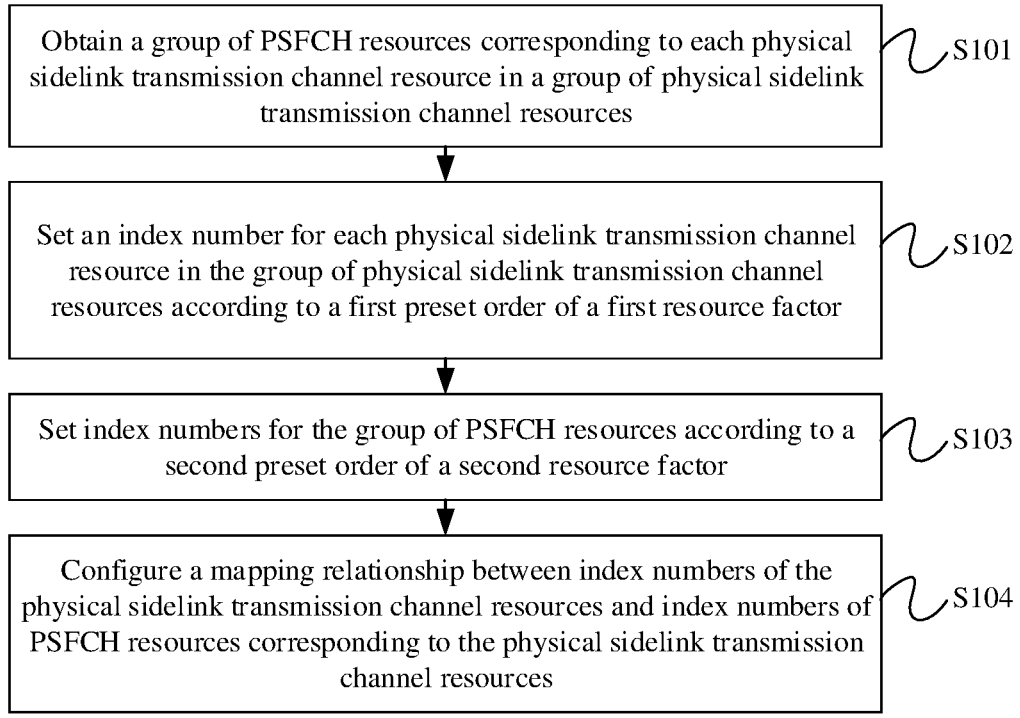
FIG. 1 is a flowchart of a sidelink resource mapping method according to an embodiment of this disclosure.

FIG. 1 is a flowchart of a sidelink resource mapping method according to an embodiment of this disclosure. The sidelink resource mapping method may be applied to a network device, for example, a base station. As shown in FIG. 1, the sidelink resource mapping method may include step S101 to step S104.

Step S101: Obtain a group of PSFCH resources corresponding to each physical sidelink transmission channel resource in a group of physical sidelink transmission channel resources.

The group of physical sidelink transmission channel resources includes at least one physical sidelink transmission channel resource. The group of PSFCH resources includes at least one PSFCH resource. The physical sidelink transmission channel resource may include a PSSCH resource and/or a PSCCH resource. There is an implicit correspondence between a PSFCH resource and a physical sidelink transmission channel resource. For each physical sidelink transmission channel resource, a group of PSFCH resources corresponding to the physical sidelink transmission channel resource may be obtained.

Step S102: Set an index number for each physical sidelink transmission channel resource in the group of physical sidelink transmission channel resources according to a first preset order of a first resource factor.

The first preset order of the first resource factor is an order with reference to which index numbers are set for physical sidelink transmission channel resources in the group of physical sidelink transmission channel resources. In this embodiment of this disclosure, an order of the index numbers of the physical sidelink transmission channel resources in the group of physical sidelink transmission channel resources is the same as the first preset order of the first resource factor.

In some examples, in a case that the first resource factor includes a time-domain factor, the first preset order includes an ascending order of time-domain unit numbers or a descending order of the slot numbers.

Figure 2:
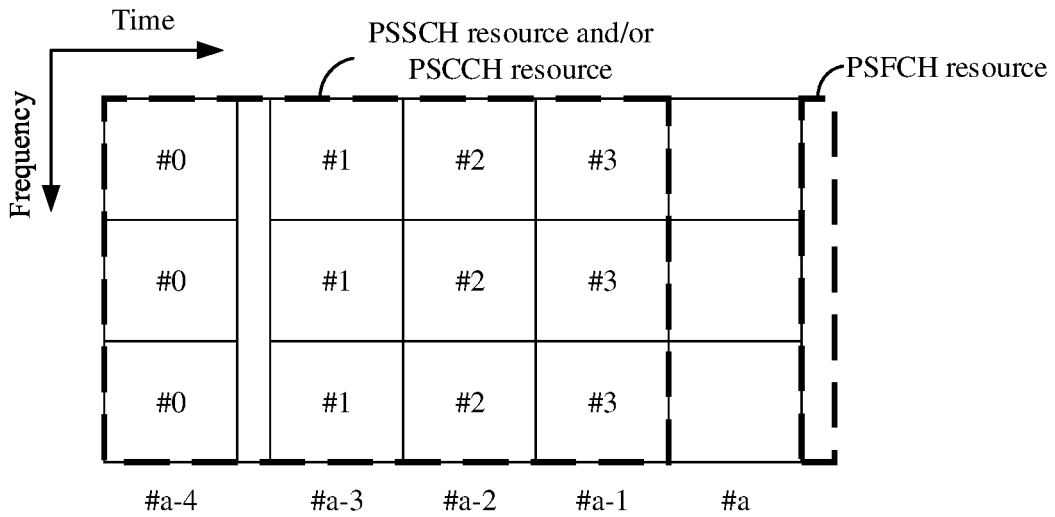
FIG. 2 is a schematic diagram of an example of a PSFCH resource and a corresponding physical sidelink transmission channel resource according to an embodiment of this disclosure.

For example, a time-domain unit may be a slot, that is, a time-domain unit number is a slot number. FIG. 2 is a schematic diagram of an example of a PSFCH resource and a corresponding physical sidelink transmission channel resource according to an embodiment of this disclosure. As shown in FIG. 2, a horizontal direction is a time domain direction, and a vertical direction is a frequency domain direction. A PSFCH resource indicated by a dashed-line box corresponds to a PSSCH resource and/or a PSCCH resource indicated by a dashed-line box. The PSSCH resource and/or the PSCCH resource indicated by the dashed-line box in FIG. 2 include PSSCH resources and/or PSCCH resources whose slot numbers are #a-4, #a-3, #a-2, and #a-1. Index numbers are set in ascending order of the slot numbers. As shown in FIG. 2, a PSSCH resource and/or a PSCCH resource whose slot number is #a-4 has an index number of #0, a PSSCH resource and/or a PSCCH resource whose slot number is #a-3 has an index number of #1, a PSSCH resource and/or a PSCCH resource whose slot number is #a-2 has an index number of #2, and a PSSCH resource and/or a PSCCH resource whose slot number is #a-1 has an index number of #3.

In some other examples, in a case that the first resource factor includes a frequency-domain factor, the first preset order includes an ascending order of frequency-domain unit numbers or a descending order of the frequency-domain unit numbers.

For example, a frequency-domain unit may be a sub-channel, that is, a frequency-domain unit number may be a sub-channel number. The first preset order may include an ascending order of sub-channel numbers or a descending order of the sub-channel numbers. For another example, a frequency-domain unit may be a physical resource block (PRB), that is, a frequency-domain unit number may be a PRB number. The first preset order may include an ascending order of PRB numbers or a descending order of the PRB numbers.

In still some other examples, in a case that the first resource factor includes the time-domain factor and the frequency-domain factor, the first preset order includes the ascending order of the frequency-domain unit numbers or the descending order of the frequency-domain unit numbers on a basis of the ascending order of the time-domain unit numbers or the descending order of the time-domain unit numbers. That is, in this example, sorting is first performed based on the time-domain factor and then performed based on the frequency-domain factor.

Figure 3:
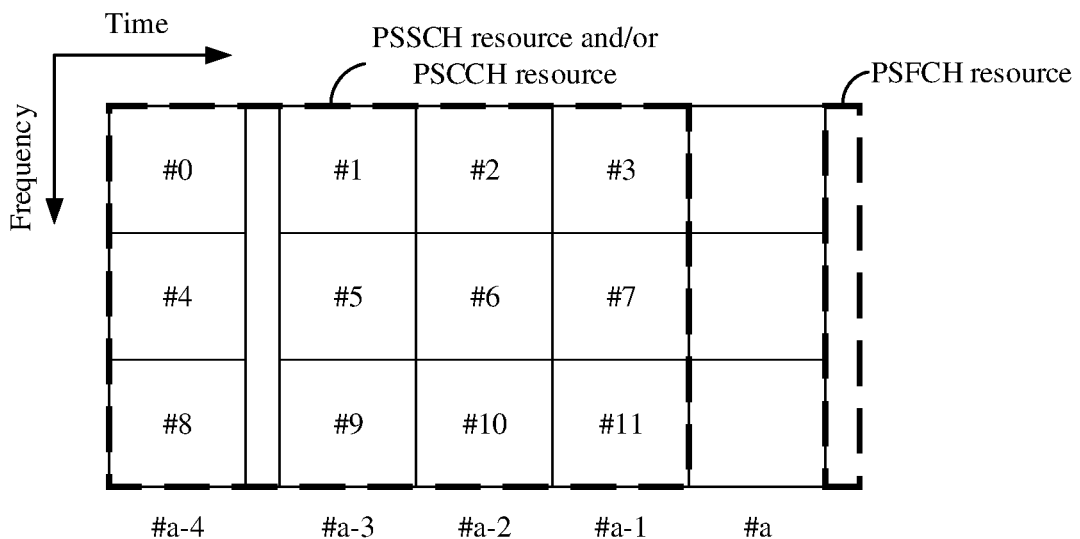
FIG. 3 is a schematic diagram of another example of a PSFCH resource and a corresponding physical sidelink transmission channel resource according to an embodiment of this disclosure.

For example, a time-domain unit may be a slot, that is, a time-domain unit number is a slot number. A frequency-domain unit may be a sub-channel, that is, a frequency-domain unit number may be a sub-channel number. FIG. 3 is a schematic diagram of another example of a PSFCH resource and a corresponding physical sidelink transmission channel resource according to an embodiment of this disclosure. A horizontal direction is a time domain direction, that is, an ascending order of time-slot numbers. A vertical direction is a frequency domain direction, that is, an ascending order of sub-channel numbers. A PSFCH resource indicated by a dashed-line box corresponds to a PSSCH resource and/or a PSCCH resource indicated by a dashed-line box. Reference is first made to the ascending order of the time-slot numbers and then to the ascending order of the sub-channel numbers. Index numbers #0 to #11 set for the PSSCH resource and/or the PSCCH resource indicated by the dashed-line box are shown in FIG. 3.

In yet some other examples, in a case that the first resource factor includes the time-domain factor and the frequency-domain factor, the first preset order includes the ascending order of the time-domain unit numbers or the descending order of the time-domain unit numbers on a basis of the ascending order of the frequency-domain unit numbers or the descending order of the frequency-domain unit numbers. That is, in this example, sorting is first performed based on the frequency-domain factor and then performed based on the time-domain factor.

In the foregoing embodiment, the frequency-domain unit number may include a frequency-domain unit number corresponding to a bandwidth of a resource pool, a frequency-domain unit number corresponding to a bandwidth part (BWP), a frequency-domain unit number corresponding to a carrier, or a frequency-domain unit number corresponding to all aggregated carriers. This is not limited herein.

A time-domain unit may be specifically a slot or the like. This is not limited herein. A frequency-domain unit may be specifically a sub-channel, a PRB, or the like. This is not limited herein. One frequency-domain unit may be one or more sub-channels, or one or more PRBs. The number of sub-channels or physical resource blocks is not limited herein.

Step S103: Set index numbers for the group of PSFCH resources according to a second preset order of a second resource factor.

The second preset order of the second resource factor is an order with reference to which index numbers are set for PSFCH resources in the group of PSFCH resources. In this embodiment of this disclosure, an order of the index numbers of the PSFCH resources in the group of PSFCH resources is the same as the second preset order of the second resource factor.

In some examples, in a case that the second resource factor includes a frequency-domain factor, the second preset order includes an ascending order of frequency-domain unit numbers or a descending order of the frequency-domain unit numbers.

For example, a frequency-domain unit may be a sub-channel, that is, a frequency-domain unit number may be a sub-channel number. The second preset order may include an ascending order of sub-channel numbers or a descending order of the sub-channel numbers. For another example, a frequency-domain unit may be a PRB, that is, a frequency-domain unit number may be a PRB number. The second preset order may include an ascending order of PRB numbers or a descending order of the PRB numbers.

In some other examples, in a case that the second resource factor includes a code-domain factor, the second preset order includes an ascending order of extremum numbers corresponding to a code sequence or a descending order of the extremum numbers corresponding to the code sequence. The extremum numbers include the smallest number and/or the largest number.

The code sequence of the PSFCH resources may include one or more code sequences.

If the code sequence of the PSFCH resources includes one code sequence, the index numbers may be set for the group of PSFCH resources directly according to an ascending order of extremum numbers corresponding to the code sequence or a descending order of the extremum numbers corresponding to the code sequence.

If the code sequence of the PSFCH resources includes a plurality of code sequences, the index numbers may be set with reference to an ascending order of extremum numbers corresponding to a second code sequence or a descending order of the extremum numbers corresponding to the second code sequence on a basis of an ascending order of extremum numbers corresponding to a first code sequence or a descending order of the extremum numbers corresponding to the first code sequence. If there is further a third code sequence, the index numbers further need to be set with reference to an ascending order of extremum numbers corresponding to a third code sequence or a descending order of the extremum numbers corresponding to the third code sequence on a basis of the ascending order of the extremum numbers corresponding to the second code sequence or the descending order of the extremum numbers corresponding to the second code sequence, and so on, until the index numbers are set with reference to an ascending order of extremum numbers corresponding to the last code sequence or a descending order of the extremum numbers corresponding to the last code sequence.

For example, the code sequence of the PSFCH resources includes an orthogonal covering code (OCC) sequence and a Zadoff-chu (ZC) sequence. The second preset order includes an ascending order of extremum numbers corresponding to the ZC sequence or a descending order of the extremum numbers corresponding to the ZC sequence on a basis of an ascending order of extremum numbers corresponding to the OCC sequence or a descending order of the extremum numbers corresponding to the OCC sequence. The ascending order of the extremum numbers corresponding to the ZC sequence may be specifically an ascending order of the largest cyclic shift (CS) numbers and/or the smallest CS numbers corresponding to the ZC sequence. Similarly, the descending order of the extremum numbers corresponding to the ZC sequence may be specifically a descending order of the largest CS numbers and/or the smallest CS numbers corresponding to the ZC sequence.

In still some other examples, in a case that the second resource factor includes the frequency-domain factor and the code-domain factor, the second preset order includes the ascending order of the extremum numbers corresponding to the code sequence or the descending order of the extremum numbers corresponding to the code sequence on a basis of the ascending order of the frequency-domain unit numbers or the descending order of the frequency-domain unit numbers.

For example, the following Table 1 shows an example of setting the index numbers for the PSFCH resources based on the frequency-domain factor and the code-domain factor.

TABLE 1

| Sub-channel number | OCC sequence extremum number | Smallest CS number | PSFCH resource index number |
|---|---|---|---|
| F0 | #0 | (#0, #6) | #0 |
| F0 | #0 | (#1, #7) | #1 |
| F0 | #0 | (#2, #8) | #2 |
| F0 | #0 | (#3, #9) | #3 |
| F0 | #0 | (#4, #10) | #4 |
| F0 | #0 | (#5, #11) | #5 |
| F0 | #1 | (#0, #6) | #6 |
| F0 | #1 | (#1, #7) | #7 |
| F0 | #1 | (#2, #8) | #8 |
| F0 | #1 | (#3, #9) | #9 |
| F0 | #1 | (#4, #10) | #10 |
| F0 | #1 | (#5, #11) | #11 |
| F0 | #2 | (#0, #6) | #12 |
| F0 | #2 | (#1, #7) | #13 |
| F0 | #2 | (#2, #8) | #14 |
| F0 | #2 | (#3, #9) | #15 |
| F0 | #2 | (#4, #10) | #16 |
| F0 | #2 | (#5, #11) | #17 |
| F0 | #3 | (#0, #6) | #18 |
| F0 | #3 | (#1, #7) | #19 |
| F0 | #3 | (#2, #8) | #20 |
| F0 | #3 | (#3, #9) | #21 |
| F0 | #3 | (#4, #10) | #22 |
| F0 | #3 | (#5, #11) | #23 |
| F1 | #0 | (#0, #6) | #24 |
| F1 | #0 | (#1, #7) | #25 |
| F1 | #0 | (#2, #8) | #26 |
| F1 | #0 | (#3, #9) | #27 |
| F1 | #0 | (#4, #10) | #28 |
| F1 | #0 | (#5, #11) | #29 |
| F1 | #1 | (#0, #6) | #30 |
| ... | ... | ... | ... |

As shown in Table 1, the PSFCH resources are first sort according to the sub-channel numbers. Among PSFCH resources with the same sub-channel number, the PSFCH resources are sort according to the OCC sequence extremum numbers. Among PSFCH resources with the same OCC sequence extremum number, the PSFCH resources are sort according to the smallest CS numbers corresponding to the ZC sequence. The index numbers are set for the group of PSFCH resources according to a final sorting result. An index number of a PSFCH resource can be uniquely determined by using a sub-channel number, an OCC sequence extremum, and a smallest CS number.

In yet some other examples, in a case that the second resource factor includes the frequency-domain factor and the code-domain factor, the second preset order includes the ascending order of the frequency-domain unit numbers or the descending order of the frequency-domain unit numbers on a basis of the ascending order of the extremum numbers corresponding to the code sequence or the descending order of the extremum numbers corresponding to the code sequence.

Compared with the foregoing example, an order of a reference factor is different in this example. For respective processing specific to the frequency-domain factor and the code-domain factor, refer to the foregoing example. Details are not described herein again.

For related content of the frequency-domain factor in the foregoing examples, refer to related descriptions in the foregoing embodiment. Details are not described herein again.

Step S104: Configure a mapping relationship between index numbers of the physical sidelink transmission channel resources and index numbers of PSFCH resources corresponding to the physical sidelink transmission channel resources.

After the index number of the physical sidelink transmission channel resource and the index numbers of the PSFCH resources are set, the mapping relationship between the index number of the physical sidelink transmission channel resource and the index numbers of the PSFCH resources is configured in accordance with the corresponding physical sidelink transmission channel resource and PSFCH resources. In a process of transmitting feedback information, a terminal device, such as UE, may select a PSFCH resource by using the configured mapping relationship to transmit the feedback information.

Specifically, the number of physical sidelink transmission channel resources in the group of physical sidelink transmission channel resources is P, and P is a positive integer. For any physical sidelink transmission channel resource, that is, the $i^{th}$ physical sidelink transmission channel resource, in the group of physical sidelink transmission channel resources, a mapping relationship may be configured between an index number of the $i^{th}$ physical sidelink transmission channel resource and index numbers of the $(\Sigma_{k=1}^{k=i-1} N_k)^{th}$ to the $(\Sigma_{k=1}^{k=i} N_k)^{th}$ PSFCH resources.

The $i^{th}$ physical sidelink transmission channel resource corresponds to the $(N_i)^{th}$ PSFCH resource. i, k, $N_k$, and $N_i$ are non-negative integers, and $1 \leq i \leq P$.

In some examples, in a case that each physical sidelink transmission channel resource corresponds to N PSFCH resources, a mapping relationship is configured between an index number of the $i^{th}$ physical sidelink transmission channel resource and index numbers of the $((i-1) \times N+1)^{th}$ to the $(i \times N)^{th}$ PSFCH resources.

In some other examples, each of some physical sidelink transmission channel resources corresponds to N PSFCH resources, and each of some physical sidelink transmission channel resources corresponds to M PSFCH resources. In a case that the $i^{th}$ physical sidelink transmission channel resource corresponds to N PSFCH resources, and L1 physical sidelink transmission channel resources that each correspond to N PSFCH resources and L2 physical sidelink transmission channel resources that each correspond to M PSFCH resources are included before the $i^{th}$ physical sidelink transmission channel resource, a mapping relationship is configured between an index number of the $i^{th}$ physical sidelink transmission channel resource and index numbers of the $(L1 \times N+L2 \times M)^{th}$ to the $((L1+1) \times N+L2 \times M)^{th}$ PSFCH resources.

In still some other examples, each of some physical sidelink transmission channel resources corresponds to N PSFCH resources, and each of some physical sidelink transmission channel resources corresponds to M PSFCH resources. In a case that the $i^{th}$ physical sidelink transmission channel resource corresponds to M PSFCH resources, and L1 physical sidelink transmission channel resources that each correspond to N PSFCH resources and L2 physical sidelink transmission channel resources that each correspond to M PSFCH resources are included before the $i^{th}$ physical sidelink transmission channel resource, a mapping relationship is configured between an index number of the $i^{th}$ physical sidelink transmission channel resource and index numbers of the $(L1 \times N+L2 \times M)^{th}$ to the $(L1 \times N+(L2+1) \times M)^{th}$ PSFCH resources.

In the foregoing examples, N is a positive integer, and M is a positive integer.

It should be noted that, if M=1, it indicates that the PSFCH resource corresponding to the physical sidelink transmission channel resource is configured for unicast and/or groupcast in which terminal devices occupy a common PSFCH resource, to transmit feedback information. If N>1, it indicates that the PSFCH resources corresponding to the physical sidelink transmission channel resource are configured for groupcast in which terminal devices occupy different PSFCH resources, to transmit feedback information.

It should be noted that a meaning of the index numbers in the foregoing embodiment may be different from that of the $k^{th}$ physical sidelink transmission channel resource and the $k^{th}$ PSFCH resource. For example, a physical sidelink transmission channel resource whose index number is #1 may be the $2^{nd}$ physical sidelink transmission channel resource, and an index number of the $1^{st}$ physical sidelink transmission channel resource is #0.

In this embodiment of this disclosure, a group of PSFCH resources corresponding to each physical sidelink transmission channel resource in a group of physical sidelink transmission channel resources is obtained, index numbers are set for the group of physical sidelink transmission channel resources according to a first preset order of a first resource factor, index numbers are set for the group of PSFCH resources according to a second preset order of a second resource factor, and a mapping relationship is established between index numbers of corresponding physical sidelink transmission channel resources and PSFCH resources, so that an implicit mapping relationship is established between the physical sidelink transmission channel resources and the PSFCH resources. This provides a reference for selecting a PSFCH resource for transmitting feedback information, and can reduce or even avoid collision on a PSFCH resource on which a plurality of pieces of feedback information are transmitted.

Figure 4:
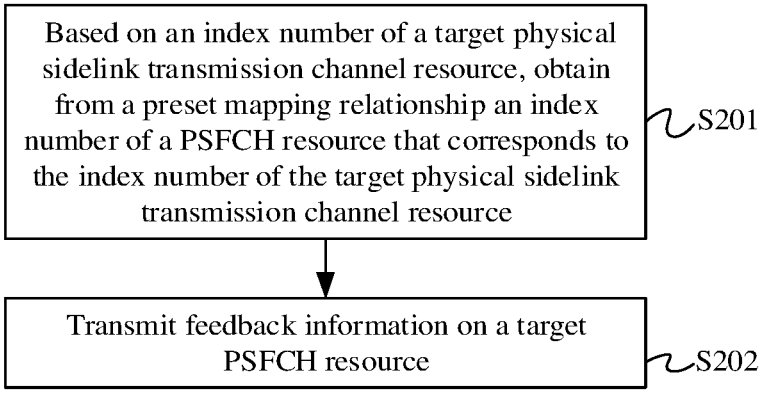
FIG. 4 is a flowchart of a sidelink resource transmission method according to an embodiment of this disclosure.

FIG. 4 is a flowchart of a sidelink resource transmission method according to an embodiment of this disclosure. The sidelink resource transmission method is applied to a terminal device, for example, UE. As shown in FIG. 4, the sidelink resource transmission method may include S201 and step S202.

Step S201: Based on an index number of a target physical sidelink transmission channel resource, obtain from a preset mapping relationship an index number of a PSFCH resource that corresponds to the index number of the target physical sidelink transmission channel resource.

The target physical sidelink transmission channel resource is a physical sidelink transmission channel resource corresponding to information received by the terminal device. Manners of selecting the target physical sidelink transmission channel resource may include but are not limited to the following manners.

In a first manner, the target physical sidelink transmission channel resource is a physical sidelink transmission channel resource with any frequency-domain unit number among physical sidelink transmission channel resources corresponding to the information received by the terminal device.

In a second manner, the target physical sidelink transmission channel resource is a physical sidelink transmission channel resource with the largest frequency-domain unit number among physical sidelink transmission channel resources corresponding to the received information.

In a third manner, the target physical sidelink transmission channel resource is a physical sidelink transmission channel resource with the smallest frequency-domain unit number among physical sidelink transmission channel resources corresponding to the received information.

In a fourth manner, the target physical sidelink transmission channel resource is a physical sidelink transmission channel resource whose frequency-domain unit number is closest to an average value of frequency-domain unit numbers among physical sidelink transmission channel resources corresponding to the received information. That is, the target physical sidelink transmission channel resource is a physical sidelink transmission channel resource whose frequency-domain unit number is in the middle among the physical sidelink transmission channel resources corresponding to the received information.

In a fifth manner, the target physical sidelink transmission channel resource is a physical sidelink transmission channel resource with the largest index number among physical sidelink transmission channel resources corresponding to the received information.

In a sixth manner, the target physical sidelink transmission channel resource is a physical sidelink transmission channel resource with the smallest index number among physical sidelink transmission channel resources corresponding to the received information.

The preset mapping relationship includes a preconfigured mapping relationship between index numbers of PSFCH resources and index numbers of physical sidelink transmission channel resources. The index numbers of the physical sidelink transmission channel resources are set according to a first preset order of a first resource factor. The index numbers of the PSFCH resources are set according to a second preset order of a second resource factor. It should be noted that the preset mapping relationship is the mapping relationship between index numbers of PSFCH resources and index numbers of physical sidelink transmission channel resources that is configured by the network device in the foregoing embodiment.

The first resource factor may include a time-domain factor and/or a frequency-domain factor.

In some examples, in a case that the first resource factor includes the time-domain factor, the first preset order includes an ascending order of time-domain unit numbers or a descending order of the time-domain unit numbers.

In some other examples, in a case that the first resource factor includes the frequency-domain factor, the first preset order includes an ascending order of frequency-domain unit numbers or a descending order of the frequency-domain unit numbers.

In still some other examples, in a case that the first resource factor includes the time-domain factor and the frequency-domain factor, the first preset order includes the ascending order of the frequency-domain unit numbers or the descending order of the frequency-domain unit numbers on a basis of the ascending order of the time-domain unit numbers or the descending order of the time-domain unit numbers.

In yet some other examples, in a case that the first resource factor includes the time-domain factor and the frequency-domain factor, the first preset order includes the ascending order of the time-domain unit numbers or the descending order of the time-domain unit numbers on a basis of the ascending order of the frequency-domain unit numbers or the descending order of the frequency-domain unit numbers.

The frequency-domain unit number includes a frequency-domain unit number corresponding to a bandwidth of a resource pool, a BWP, a carrier, or an aggregation.

The second resource factor may include a frequency-domain factor and/or a code-domain factor.

In some examples, in a case that the second resource factor includes the frequency-domain factor, the second preset order includes an ascending order of frequency-domain unit numbers or a descending order of the frequency-domain unit numbers.

In some other examples, in a case that the second resource factor includes the code-domain factor, the second preset order includes an ascending order of extremum numbers corresponding to a code sequence or a descending order of the extremum numbers corresponding to the code sequence. The extremum numbers include the smallest number and/or the largest number.

In still some other examples, in a case that the second resource factor includes the frequency-domain factor and the code-domain factor, the second preset order includes the ascending order of the extremum numbers corresponding to the code sequence or the descending order of the extremum numbers corresponding to the code sequence on a basis of the ascending order of the frequency-domain unit numbers or the descending order of the frequency-domain unit numbers.

In yet some other examples, in a case that the second resource factor includes the frequency-domain factor and the code-domain factor, the second preset order includes the ascending order of the frequency-domain unit numbers or the descending order of the frequency-domain unit numbers on a basis of the ascending order of the extremum numbers corresponding to the code sequence or the descending order of the extremum numbers corresponding to the code sequence.

For specific descriptions of the first resource factor, the second resource factor, and the preset mapping relationship, refer to related descriptions in the foregoing embodiment. Details are not described herein again.

Step S202: Transmit feedback information on a target PSFCH resource.

The index number of the PSFCH resource that corresponds to the index number of the target physical sidelink transmission channel resource includes an index number of the target PSFCH resource. That is, the target PSFCH resource may be selected from PSFCH resources whose index numbers correspond to the index number of the target physical sidelink transmission channel resource in the preset mapping relationship. ACK feedback information or NACK feedback information is transmitted on the target PSFCH resource.

The terminal device may choose to transmit the feedback information on the target PSFCH resource. If there is one PSFCH resource whose index number corresponds to the index number of the target physical sidelink transmission channel resource in the preset mapping relationship, the one PSFCH resource serves as the target PSFCH resource. If there are a plurality of PSFCH resources whose index numbers correspond to the index number of the target physical sidelink transmission channel resource in the preset mapping relationship, one or more of the plurality of PSFCH resources may be selected as the target PSFCH resource.

Figure 5:
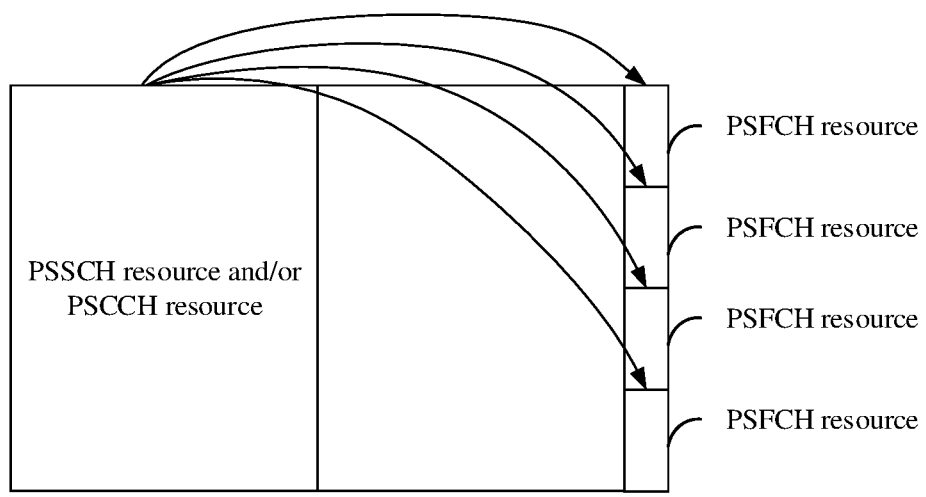
FIG. 5 is a schematic diagram of an example of a correspondence between a physical sidelink transmission channel resource and a PSFCH resource according to an embodiment of this disclosure.
Figure 6:
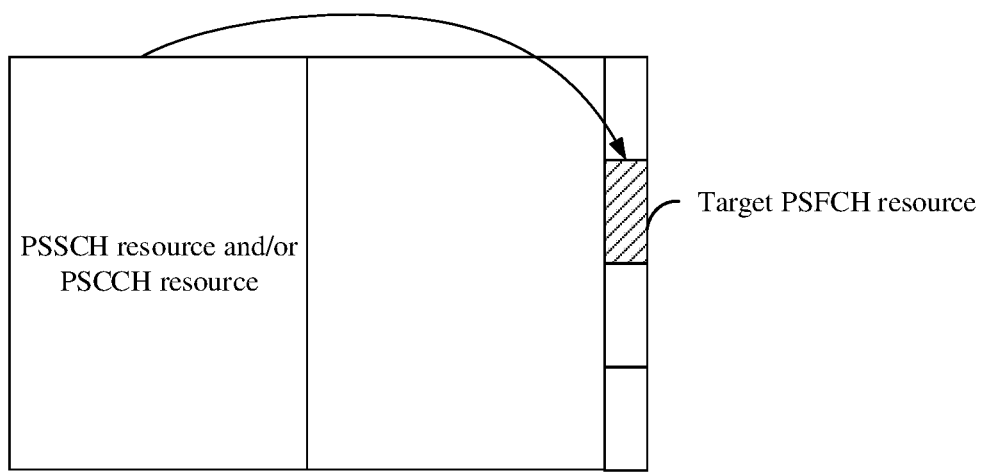
FIG. 6 is a schematic diagram of an example of a correspondence between a physical sidelink transmission channel resource and a target PSFCH resource according to an embodiment of this disclosure.

FIG. 5 is a schematic diagram of an example of a correspondence between a physical sidelink transmission channel resource and a PSFCH resource according to an embodiment of this disclosure. As shown in FIG. 5, the physical sidelink transmission channel resource corresponds to four PSFCH resources. FIG. 6 is a schematic diagram of an example of a correspondence between a physical sidelink transmission channel resource and a target PSFCH resource according to an embodiment of this disclosure. As shown in FIG. 6, one of four PSFCH resources corresponding to the physical sidelink transmission channel resource is selected as the target PSFCH resource.

The following describes several cases that unicast transmission, groupcast transmission, and the like are performed on the target physical sidelink transmission channel resource.

In a case that unicast transmission is performed on the target physical sidelink transmission channel resource, the number of index numbers of PSFCH resources that correspond to the index number of the target physical sidelink transmission channel resource in the preset mapping relationship is S1. That is, the number of PSFCH resources whose index numbers correspond to the index number of the target physical sidelink transmission channel resource in the preset mapping relationship is S1.

The index number of the target PSFCH resource includes index numbers of S2 PSFCH resources that correspond to the index number of the target physical sidelink transmission channel resource in the preset mapping relationship. S1 is a positive integer, and S2 is a positive integer less than or equal to S1. That is, the index numbers of the S2 PSFCH resources are selected from the index numbers of the S1 PSFCH resources as the index number of the target PSFCH resource. This is equivalent to selecting the S2 PSFCH resources from the S1 PSFCH resources as the target PSFCH resource.

In some examples, in a case that S1=1, a PSFCH resource corresponding to the one index number serves as the target PSFCH resource, and the feedback information is transmitted on the target PSFCH resource.

In some other examples, in a case that S1>1, S2=S1, that is, PSFCH resources corresponding to the S1 index numbers may alternatively serve as the target PSFCH resource. That is, the number of target PSFCH resources is S1, and the feedback information is transmitted on the S1 target PSFCH resources. For example, S1=S2=2. Two transport blocks (TB) are transmitted on the physical sidelink transmission channel resource through spatial multiplexing, that is, two TBs respectively carry a codeword (CW) #0 and a CW #1. A first target PSFCH resource may correspond to feedback information for a first TB/CW #0, and a second target PSFCH resource may correspond to feedback information for a second TB/CW #1.

In still some other examples, in a case that S1>1, S2=1. To be specific, an index number of one PSFCH resource is selected, as the index number of the target PSFCH resource, from the index numbers of the S1 PSFCH resources that correspond to the index number of the target physical sidelink transmission channel resource in the preset mapping relationship. That is, one PSFCH resource is selected, as the target PSFCH resource, from the S1 PSFCH resources whose index numbers correspond to the index number of the target physical sidelink transmission channel resource in the preset mapping relationship, and the feedback information is transmitted on the one target PSFCH resource.

Specifically, a specific PSFCH resource may be selected from the S1 PSFCH resources as the target PSFCH resource based on a device identification code of the terminal device related to the transmission of the feedback information. For example, the index number of the target PSFCH resource is an index number of the $n1^{th}$ PSFCH resource that corresponds to the index number of the target physical sidelink transmission channel resource in the preset mapping relationship. That is, the target PSFCH resource is the $n1^{th}$ PSFCH resource whose index number corresponds to the index number of the target physical sidelink transmission channel resource in the preset mapping relationship. n1= [device identification code] mod [S1]. mod indicates a modulo operation. That is, n1 is a remainder of the device identification code divided by S1.

In yet some other examples, in a case that S1>1, S2>1. To be specific, index numbers of S2 PSFCH resources are selected, as the index number of the target PSFCH resource, from the index numbers of the S1 PSFCH resources that correspond to the index number of the target physical sidelink transmission channel resource in the preset mapping relationship. That is, S2 PSFCH resources are selected, as the target PSFCH resource, from the S1 PSFCH resources whose index numbers correspond to the index number of the target physical sidelink transmission channel resource in the preset mapping relationship, and the feedback information is transmitted on the S2 target PSFCH resources.

Specifically, a specific S2 PSFCH resource may be selected from the S1 PSFCH resources as the target PSFCH resource based on the device identification code of the terminal device related to the transmission of the feedback information. For example, the index number of the target PSFCH resource includes an index number of the $n1^{th}$ PSFCH resource that corresponds to the index number of the target physical sidelink transmission channel resource in the preset mapping relationship, and an index number of at least one another PSFCH resource that corresponds to the index number of the target physical sidelink transmission channel resource in the preset mapping relationship. That is, the target PSFCH resource includes the $n1^{th}$ PSFCH resource whose index number corresponds to the index number of the target physical sidelink transmission channel resource in the preset mapping relationship, and the at least one another PSFCH resource whose index number corresponds to the index number of the target physical sidelink transmission channel resource in the preset mapping relationship. n1= [device identification code] mod [S1]. For example, S2=2. The index number of the target PSFCH resource includes the index number of the $n1^{th}$ PSFCH resource that corresponds to the index number of the target physical sidelink transmission channel resource in the preset mapping relationship, and an index number of the $(n1+L)^{th}$ PSFCH resource that corresponds to the index number of the target physical sidelink transmission channel resource in the preset mapping relationship. L is a positive integer.

The device identification code may include one of the following:

at least a part of an identifier of the terminal device, at least a part of a groupcast identifier of the terminal device, at least a part of an identifier of a transmit terminal device corresponding to the terminal device, and a spliced code that includes at least a part of the identifier of the terminal device and at least a part of the identifier of the transmit terminal device corresponding to the terminal device.

The terminal device is a receive terminal device (for example, RX UE), and the terminal device corresponds to the transmit terminal device (for example, TX UE). The at least a part of the identifier (ID) of the terminal device may be the entire identifier of the terminal device, or may be a part of the identifier of the terminal device, for example, the last eight characters of the identifier of the terminal device. The spliced code that includes the at least a part of the identifier of the terminal device and the at least a part of the identifier of the transmit terminal device corresponding to the terminal device is a spliced code obtained by splicing the at least a part of the identifier of the terminal device and the at least a part of the identifier of the corresponding transmit terminal device. For example, the last eight characters of the RX UE ID and the last eight characters of the TX UE ID constitute a 16-character spliced code.

In a case that groupcast transmission is performed on the target physical sidelink transmission channel resource and the terminal device and another terminal device occupy the same PSFCH resource, the number of index numbers of PSFCH resources that correspond to the index number of the target physical sidelink transmission channel resource in the preset mapping relationship is S3. The index number of the target PSFCH resource is an index number of a PSFCH resource that corresponds to the index number of the target physical sidelink transmission channel resource in the preset mapping relationship. S3 is a positive integer.

It should be noted that, in a case that groupcast transmission is performed on the target physical sidelink transmission channel resource and the terminal device and another terminal device occupy the same PSFCH resource, the terminal device feeds back only NACK feedback information on the PSFCH resource.

In some examples, in a case that S3=1, because the number of index numbers of PSFCH resources that correspond to the index number of the target physical sidelink transmission channel resource in the preset mapping relationship is 1, the index number of the one PSFCH resource serves as the index number of the target PSFCH resource, that is, the one PSFCH resource is the target PSFCH resource, and the feedback information is transmitted on the target PSFCH resource.

In some other examples, in a case that S3>1, an index number of one PSFCH resource may be selected, as the index number of the target PSFCH resource, from the index numbers of the S3 PSFCH resources that correspond to the index number of the target physical sidelink transmission channel resource in the preset mapping relationship. That is, one PSFCH resource is selected, as the target PSFCH resource, from the S3 PSFCH resources whose index numbers correspond to the index number of the target physical sidelink transmission channel resource in the preset mapping relationship, and the feedback information is transmitted on the target PSFCH resource.

Specifically, a specific PSFCH resource may be selected from the S3 PSFCH resources as the target PSFCH resource based on a device identification code of the terminal device related to the transmission of the feedback information. For example, the index number of the target PSFCH resource is an index number of the $n2^{th}$ PSFCH resource that corresponds to the index number of the target physical sidelink transmission channel resource in the preset mapping relationship. n2=[device identification code] mod [S3].

The device identification code may include one of the following:

at least a part of an identifier of the terminal device, at least a part of a groupcast identifier of the terminal device, at least a part of an identifier of a transmit terminal device corresponding to the terminal device, a spliced code that includes at least a part of the identifier of the terminal device and at least a part of the identifier of the transmit terminal device corresponding to the terminal device, and a spliced code that includes at least a part of the groupcast identifier of the terminal device and at least a part of the identifier of the transmit terminal device corresponding to the terminal device.

The groupcast identifier of the terminal device may be different from the identifier of the terminal device.

In a case that groupcast transmission is performed on the target physical sidelink transmission channel resource and the terminal device and another terminal device occupy different PSFCH resources, the number of index numbers of PSFCH resources that correspond to the index number of the target physical sidelink transmission channel resource in the preset mapping relationship is S4. S4 is a positive integer.

The index number of the target PSFCH resource is an index number of the $n3^{th}$ PSFCH resource that corresponds to the index number of the target physical sidelink transmission channel resource in the preset mapping relationship. That is, the $n3^{th}$ PSFCH resource whose index number corresponds to the index number of the target physical sidelink transmission channel resource in the preset mapping relationship serves as the target PSFCH resource. n3=[first device identification code] mod [S4].

It should be noted that, in a case that groupcast transmission is performed on the target physical sidelink transmission channel resource and the terminal device and another terminal device occupy different PSFCH resources, the terminal devices feed back ACK feedback information or NACK feedback information on their respective corresponding target PSFCH resources.

The first device identification code includes at least a part of an in-group identifier (in-group ID) of the terminal device.

In a case that groupcast transmission is performed on the target physical sidelink transmission channel resource and the terminal device and another terminal device occupy different PSFCH resources, the number of index numbers of PSFCH resources that correspond to the index number of the target physical sidelink transmission channel resource in the preset mapping relationship is S5. S5 is a positive integer.

The index number of the target PSFCH resource is an index number of the $n4^{th}$ PSFCH resource that corresponds to the index number of the target physical sidelink transmission channel resource in the preset mapping relationship. That is, the $n4^{th}$ PSFCH resource whose index number corresponds to the index number of the target physical sidelink transmission channel resource in the preset mapping relationship serves as the target PSFCH resource. n4=([first device identification code] mod [S5])×Y+[second device identification code] mod [Y]. Y is a configuration parameter, and Y is a positive integer. Y may be preconfigured.

The first device identification code includes at least a part of an in-group identifier (in-group ID) of the terminal device.

The second device identification code includes one of the following:

at least a part of an identifier of the terminal device, at least a part of a groupcast identifier of the terminal device, at least a part of an identifier of a transmit terminal device corresponding to the terminal device, a spliced code that includes at least a part of the identifier of the terminal device and at least a part of the identifier of the transmit terminal device corresponding to the terminal device, and a spliced code that includes at least a part of the groupcast identifier of the terminal device and at least a part of the identifier of the transmit terminal device corresponding to the terminal device.

For related content of the device identification code, refer to related descriptions in the foregoing embodiment. Details are not described herein again.

It should be noted that a PSFCH resource occupied by unicast transmission, groupcast transmission in which terminal devices occupy the same PSFCH resource, or groupcast transmission in which terminal devices occupy different PSFCH resources is specifically an orthogonal PSFCH resource.

In the foregoing embodiment, n1, n2, n3, and n4 are calculated in a process of selecting the target PSFCH resource, and the identification code of the terminal device is introduced, and may specifically include the identifier of the terminal device, the groupcast identifier of the terminal device, the in-group identifier of the terminal device, the identification code of the transmit terminal device corresponding to the terminal device, and the like. By introducing the identification code of the terminal device, when different terminal devices select target PSFCH resources, the target PSFCH resources are selected more randomly, thereby reducing HARQ reception interference caused by PSFCH resource collision between the terminal devices. Particularly, in a case that the number of PSFCH resources whose index numbers correspond to the index number of the target physical sidelink transmission channel resource in the preset mapping relationship is far greater than the number of terminal devices, higher randomization can be achieved, thereby further reducing HARQ reception interference caused by PSFCH resource collision between the terminal devices.

In this embodiment of this disclosure, the target PSFCH resource corresponding to the target physical sidelink transmission channel resource may be searched for by using the mapping relationship preset by the network device, and the feedback information is transmitted on the target PSFCH resource. The preset mapping relationship provides an implicit mapping relationship between physical sidelink transmission channel resources and PSFCH resources. The target PSFCH resource occupied for transmitting the feedback information may be selected based on a specific preset mapping relationship, thereby reducing or even avoiding collision on a PSFCH resource on which a plurality of pieces of feedback information are transmitted.

It should be noted that, in the foregoing embodiment, a PSFCH resource that is occupied by unicast transmission and whose index number corresponds to the index number of the target physical sidelink transmission channel resource in the preset mapping relationship, a PSFCH resource that is jointly occupied by terminal devices in groupcast transmission and whose index number corresponds to the index number of the target physical sidelink transmission channel resource in the preset mapping relationship, and a PSFCH resource that is occupied by each terminal device in groupcast transmission and whose index number corresponds to the index number of the target physical sidelink transmission channel resource in the preset mapping relationship may be the same or different.

For ease of description, it is assumed that a first PSFCH resource set includes a PSFCH resource that is occupied by unicast transmission and whose index number corresponds to the index number of the target physical sidelink transmission channel resource in the preset mapping relationship, a second PSFCH resource includes a PSFCH resource that is jointly occupied by terminal devices in groupcast transmission and whose index number corresponds to the index number of the target physical sidelink transmission channel resource in the preset mapping relationship, and a third PSFCH resource set includes a PSFCH resource that is occupied by each terminal device in groupcast transmission and whose index number corresponds to the index number of the target physical sidelink transmission channel resource in the preset mapping relationship.

In some examples, the first PSFCH resource set, the second PSFCH resource set, and the third PSFCH resource set are the same.

In some other examples, the first PSFCH resource set is the same as the second PSFCH resource set, and the first PSFCH resource set is different from the third PSFCH resource set. Similarly, the second PSFCH resource set is different from the third PSFCH resource set.

In still some other examples, the first PSFCH resource set is the same as the third PSFCH resource set, and the first PSFCH resource set is different from the second PSFCH resource set. Similarly, the third PSFCH resource set is different from the second PSFCH resource set.

In yet some other examples, the first PSFCH resource set, the second PSFCH resource set, and the third PSFCH resource set are different from each other.

It should be noted that the physical sidelink transmission channel resource in the foregoing embodiment may be alternatively a standalone PSCCH resource, that is, a PSCCH resource that does not need to be bound to a PSSCH resource.

Figure 7:
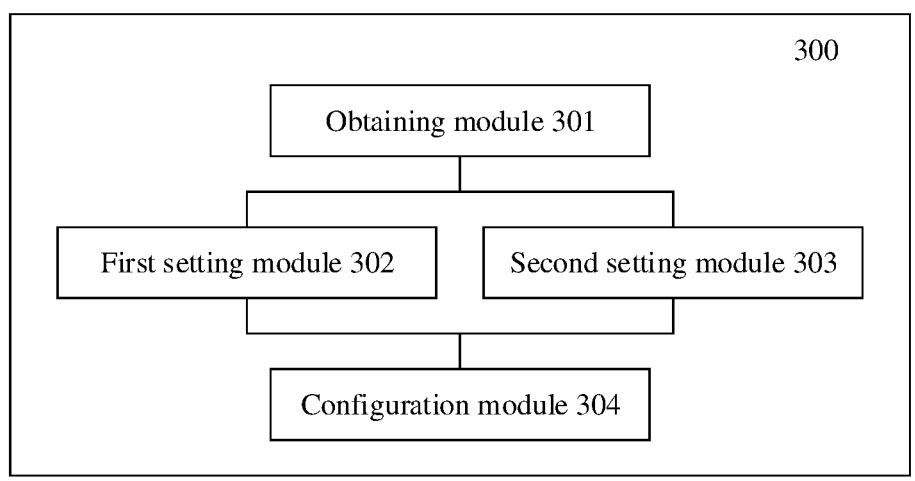
FIG. 7 is a schematic structural diagram of a network device according to an embodiment of this disclosure.

FIG. 7 is a schematic structural diagram of a network device according to an embodiment of this disclosure. As shown in FIG. 7, the network device 300 may include an obtaining module 301, a first setting module 302, a second setting module 303, and a configuration module 304.

The obtaining module 301 is configured to obtain a group of PSFCH resources corresponding to each physical sidelink transmission channel resource in a group of physical sidelink transmission channel resources.

The physical sidelink transmission channel resource includes a PSSCH resource and/or a PSCCH resource.

The first setting module 302 is configured to set an index number for each physical sidelink transmission channel resource in the group of physical sidelink transmission channel resources according to a first preset order of a first resource factor.

The second setting module 303 is configured to set index numbers for the group of PSFCH resources according to a second preset order of a second resource factor.

The configuration module 304 is configured to configure a mapping relationship between index numbers of the physical sidelink transmission channel resources and index numbers of PSFCH resources corresponding to the physical sidelink transmission channel resources.

In this embodiment of this disclosure, a group of PSFCH resources corresponding to each physical sidelink transmission channel resource in a group of physical sidelink transmission channel resources is obtained, index numbers are set for the group of physical sidelink transmission channel resources according to a first preset order of a first resource factor, index numbers are set for the group of PSFCH resources according to a second preset order of a second resource factor, and a mapping relationship is established between index numbers of corresponding physical sidelink transmission channel resources and PSFCH resources, so that an implicit mapping relationship is established between the physical sidelink transmission channel resources and the PSFCH resources. This provides a reference for selecting a PSFCH resource for transmitting feedback information, and can reduce or even avoid collision on a PSFCH resource on which a plurality of pieces of feedback information are transmitted.

In some embodiments, the first resource factor includes a time-domain factor and/or a frequency-domain factor.

In some examples, in a case that the first resource factor includes the time-domain factor, the first preset order includes an ascending order of time-domain unit numbers or a descending order of the time-domain unit numbers.

In some other examples, in a case that the first resource factor includes the frequency-domain factor, the first preset order includes an ascending order of frequency-domain unit numbers or a descending order of the frequency-domain unit numbers.

In still some other examples, in a case that the first resource factor includes the time-domain factor and the frequency-domain factor, the first preset order includes the ascending order of the frequency-domain unit numbers or the descending order of the frequency-domain unit numbers on a basis of the ascending order of the time-domain unit numbers or the descending order of the time-domain unit numbers.

In yet some other examples, in a case that the first resource factor includes the time-domain factor and the frequency-domain factor, the first preset order includes the ascending order of the time-domain unit numbers or the descending order of the time-domain unit numbers on a basis of the ascending order of the frequency-domain unit numbers or the descending order of the frequency-domain unit numbers.

In a case that the first resource factor includes the frequency-domain factor, the frequency-domain unit number includes a frequency-domain unit number corresponding to a bandwidth of a resource pool, a bandwidth part, a carrier, or an aggregation.

In some other embodiments, the second resource factor includes a frequency-domain factor and/or a code-domain factor.

In some examples, in a case that the second resource factor includes the frequency-domain factor, the second preset order includes an ascending order of frequency-domain unit numbers or a descending order of the frequency-domain unit numbers.

In some other examples, in a case that the second resource factor includes the code-domain factor, the second preset order includes an ascending order of extremum numbers corresponding to a code sequence or a descending order of the extremum numbers corresponding to the code sequence. The extremum numbers include the smallest number and/or the largest number.

In still some other examples, in a case that the second resource factor includes the frequency-domain factor and the code-domain factor, the second preset order includes the ascending order of the extremum numbers corresponding to the code sequence or the descending order of the extremum numbers corresponding to the code sequence on a basis of the ascending order of the frequency-domain unit numbers or the descending order of the frequency-domain unit numbers.

In yet some other examples, in a case that the second resource factor includes the frequency-domain factor and the code-domain factor, the second preset order includes the ascending order of the frequency-domain unit numbers or the descending order of the frequency-domain unit numbers on a basis of the ascending order of the extremum numbers corresponding to the code sequence or the descending order of the extremum numbers corresponding to the code sequence.

In some embodiments, the number of physical sidelink transmission channel resources in the group of physical sidelink transmission channel resources is P, where P is a positive integer. The configuration module is specifically configured to:

configure a mapping relationship between an index number of the $i^{th}$ physical sidelink transmission channel resource and index numbers of the $(\Sigma_{k=1}^{k=i-1} N_k)^{th}$ to the $(\Sigma_{k=1}^{k=i} N_k)^{th}$ PSFCH resources.

The $i^{th}$ physical sidelink transmission channel resource corresponds to $N_i$ PSFCH resources, i, k, $N_k$, and $N_i$ are non-negative integers, and $1 \leq i \leq P$.

Figure 8:
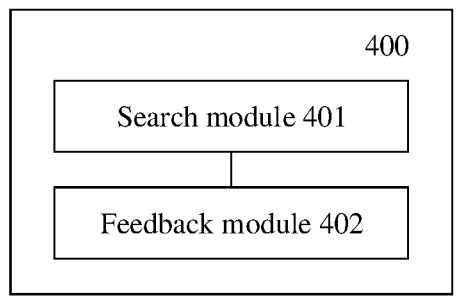
FIG. 8 is a schematic structural diagram of a terminal device according to an embodiment of this disclosure.

FIG. 8 is a schematic structural diagram of a terminal device according to an embodiment of this disclosure. As shown in FIG. 8, the terminal device 400 may include a search module 401 and a feedback module 402.

The search module 401 is configured to, based on an index number of a target physical sidelink transmission channel resource, obtain from a preset mapping relationship an index number of a PSFCH resource that corresponds to the index number of the target physical sidelink transmission channel resource.

The feedback module 402 is configured to transmit feedback information on a target PSFCH resource. The index number of the PSFCH resource that corresponds to the index number of the target physical sidelink transmission channel resource includes an index number of the target PSFCH resource.

The preset mapping relationship includes a preconfigured mapping relationship between index numbers of PSFCH resources and index numbers of physical sidelink transmission channel resources. The index numbers of the physical sidelink transmission channel resources are set according to a first preset order of a first resource factor. The index numbers of the PSFCH resources are set according to a second preset order of a second resource factor. The target physical sidelink transmission channel resource is a physical sidelink transmission channel resource corresponding to received information.

In this embodiment of this disclosure, the target PSFCH resource corresponding to the target physical sidelink transmission channel resource may be searched for by using the mapping relationship preset by the network device, and the feedback information is transmitted on the target PSFCH resource. The preset mapping relationship provides an implicit mapping relationship between physical sidelink transmission channel resources and PSFCH resources. The target PSFCH resource occupied for transmitting the feedback information may be selected based on a specific preset mapping relationship, thereby reducing or even avoiding collision on a PSFCH resource on which a plurality of pieces of feedback information are transmitted.

Specifically, the target physical sidelink transmission channel resource in the foregoing embodiment is a physical sidelink transmission channel resource with any frequency-domain unit number among physical sidelink transmission channel resources corresponding to the received information; or the target physical sidelink transmission channel resource is a physical sidelink transmission channel resource with the largest frequency-domain unit number among physical sidelink transmission channel resources corresponding to the received information; or the target physical sidelink transmission channel resource is a physical sidelink transmission channel resource with the smallest frequency-domain unit number among physical sidelink transmission channel resources corresponding to the received information;

or the target physical sidelink transmission channel resource is a physical sidelink transmission channel resource whose frequency-domain unit number is closest to an average value of frequency-domain unit numbers among physical sidelink transmission channel resources corresponding to the received information; or the target physical sidelink transmission channel resource is a physical sidelink transmission channel resource with the largest index number among physical sidelink transmission channel resources corresponding to the received information; or the target physical sidelink transmission channel resource is a physical sidelink transmission channel resource with the smallest index number among physical sidelink transmission channel resources corresponding to the received information.

In some embodiments, in a case that unicast transmission is performed on the target physical sidelink transmission channel resource, the number of index numbers of PSFCH resources that correspond to the index number of the target physical sidelink transmission channel resource in the preset mapping relationship is S1. The index number of the target PSFCH resource includes index numbers of S2 PSFCH resources that correspond to the index number of the target physical sidelink transmission channel resource in the preset mapping relationship.

S1 is a positive integer, and S2 is a positive integer less than or equal to S1.

Specifically, the index number of the target PSFCH resource includes at least an index number of the $n1^{th}$ PSFCH resource that corresponds to the index number of the target physical sidelink transmission channel resource in the preset mapping relationship, and n1=[device identification code] mod [S1].

In some other embodiments, in a case that groupcast transmission is performed on the target physical sidelink transmission channel resource and the terminal device and another terminal device occupy the same PSFCH resource, the number of index numbers of PSFCH resources that correspond to the index number of the target physical sidelink transmission channel resource in the preset mapping relationship is S3. The index number of the target PSFCH resource is an index number of a PSFCH resource that corresponds to the index number of the target physical sidelink transmission channel resource in the preset mapping relationship.

S3 is a positive integer.

Specifically, in a case that S3 is greater than 1, the index number of the target PSFCH resource is an index number of the $n2^{th}$ PSFCH resource that corresponds to the index number of the target physical sidelink transmission channel resource in the preset mapping relationship, where n2=[device identification code] mod [S3].

In the foregoing embodiment, the device identification code includes one of the following:

at least a part of an identifier of the terminal device, at least a part of a groupcast identifier of the terminal device, at least a part of an identifier of a transmit terminal device corresponding to the terminal device, a spliced code that includes at least a part of the identifier of the terminal device and at least a part of the identifier of the transmit terminal device corresponding to the terminal device, and a spliced code that includes at least a part of the groupcast identifier of the terminal device and at least a part of the identifier of the transmit terminal device corresponding to the terminal device.

In still some other embodiments, in a case that groupcast transmission is performed on the target physical sidelink transmission channel resource and the terminal device and another terminal device occupy different PSFCH resources, the number of index numbers of PSFCH resources that correspond to the index number of the target physical sidelink transmission channel resource in the preset mapping relationship is S4. The index number of the target PSFCH resource is an index number of the $n3^{th}$ PSFCH resource that corresponds to the index number of the target physical sidelink transmission channel resource in the preset mapping relationship. n3=[first device identification code] mod [S4].

S4 is a positive integer.

In yet some other embodiments, in a case that groupcast transmission is performed on the target physical sidelink transmission channel resource and the terminal device and another terminal device occupy different PSFCH resources, the number of index numbers of PSFCH resources that correspond to the index number of the target physical sidelink transmission channel resource in the preset mapping relationship is S5. The index number of the target PSFCH resource is an index number of the $n4^{th}$ PSFCH resource that corresponds to the index number of the target physical sidelink transmission channel resource in the preset mapping relationship. n4=([first device identification code] mod [S5])×Y+[second device identification code] mod [Y].

S5 is a positive integer, Y is a configuration parameter, and Y is a positive integer.

In the foregoing embodiment, the first device identification code includes at least a part of an in-group identifier of the terminal device.

The second device identification code includes one of the following:

at least a part of an identifier of the terminal device, at least a part of a groupcast identifier of the terminal device, at least a part of an identifier of a transmit terminal device corresponding to the terminal device, a spliced code that includes at least a part of the identifier of the terminal device and at least a part of the identifier of the transmit terminal device corresponding to the terminal device, and a spliced code that includes at least a part of the groupcast identifier of the terminal device and at least a part of the identifier of the transmit terminal device corresponding to the terminal device.

For ease of description, a first PSFCH resource set includes a PSFCH resource that is occupied by unicast transmission and whose index number corresponds to the index number of the target physical sidelink transmission channel resource in the preset mapping relationship;

a second PSFCH resource includes a PSFCH resource that is jointly occupied by terminal devices in groupcast transmission and whose index number corresponds to the index number of the target physical sidelink transmission channel resource in the preset mapping relationship; and a third PSFCH resource set includes a PSFCH resource that is occupied by each terminal device in groupcast transmission and whose index number corresponds to the index number of the target physical sidelink transmission channel resource in the preset mapping relationship.

In some examples, the first PSFCH resource set, the second PSFCH resource set, and the third PSFCH resource set are the same.

In some other examples, the first PSFCH resource set is the same as the second PSFCH resource set, and the first PSFCH resource set is different from the third PSFCH resource set.

In still some other examples, the first PSFCH resource set is the same as the third PSFCH resource set, and the first PSFCH resource set is different from the second PSFCH resource set.

In yet some other examples, the first PSFCH resource set, the second PSFCH resource set, and the third PSFCH resource set are different from each other.

In some embodiments, the first resource factor includes a time-domain factor and/or a frequency-domain factor.

In some examples, in a case that the first resource factor includes the time-domain factor, the first preset order includes an ascending order of time-domain unit numbers or a descending order of the time-domain unit numbers.

In some other examples, in a case that the first resource factor includes the frequency-domain factor, the first preset order includes an ascending order of frequency-domain unit numbers or a descending order of the frequency-domain unit numbers.

In still some other examples, in a case that the first resource factor includes the time-domain factor and the frequency-domain factor, the first preset order includes the ascending order of the frequency-domain unit numbers or the descending order of the frequency-domain unit numbers on a basis of the ascending order of the time-domain unit numbers or the descending order of the time-domain unit numbers.

In yet some other examples, in a case that the first resource factor includes the time-domain factor and the frequency-domain factor, the first preset order includes the ascending order of the time-domain unit numbers or the descending order of the time-domain unit numbers on a basis of the ascending order of the frequency-domain unit numbers or the descending order of the frequency-domain unit numbers.

In a case that the first resource factor includes the frequency-domain factor, the frequency-domain unit number includes a frequency-domain unit number corresponding to a bandwidth of a resource pool, a bandwidth part, a carrier, or an aggregation.

In some other embodiments, the second resource factor includes a frequency-domain factor and/or a code-domain factor.

In some examples, in a case that the second resource factor includes the frequency-domain factor, the second preset order includes an ascending order of frequency-domain unit numbers or a descending order of the frequency-domain unit numbers.

In some other examples, in a case that the second resource factor includes the code-domain factor, the second preset order includes an ascending order of extremum numbers corresponding to a code sequence or a descending order of the extremum numbers corresponding to the code sequence. The extremum numbers include the smallest number and/or the largest number.

In still some other examples, in a case that the second resource factor includes the frequency-domain factor and the code-domain factor, the second preset order includes the ascending order of the extremum numbers corresponding to the code sequence or the descending order of the extremum numbers corresponding to the code sequence on a basis of the ascending order of the frequency-domain unit numbers or the descending order of the frequency-domain unit numbers.

In yet some other examples, in a case that the second resource factor includes the frequency-domain factor and the code-domain factor, the second preset order includes the ascending order of the frequency-domain unit numbers or the descending order of the frequency-domain unit numbers on a basis of the ascending order of the extremum numbers corresponding to the code sequence or the descending order of the extremum numbers corresponding to the code sequence.

The network device provided in this embodiment of this disclosure can implement the processes implemented by the network device in the method embodiment in FIG. 1. To avoid repetition, details are not described herein again.

Figure 9:
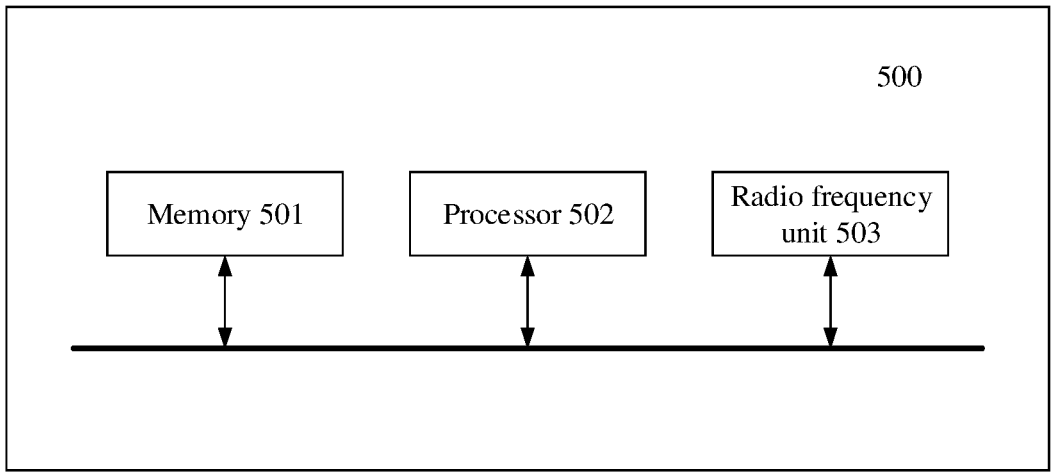
FIG. 9 is a schematic diagram of a hardware structure of a network device for implementing the foregoing embodiment.

FIG. 9 is a schematic diagram of a hardware structure of a network device for implementing the foregoing embodiment. As shown in FIG. 9, the network device 500 includes a memory 501, a processor 502, a radio frequency unit 503, and a computer program stored in the memory 501 and capable of running on the processor 502. A person skilled in the art can understand that the structure of the network device shown in FIG. 9 does not constitute a limitation on the network device. The network device may include more or fewer components than those shown in the figure, or some components may be combined, or there may be a different component layout.

The processor 502 is configured to: obtain a group of physical sidelink feedback channel PSFCH resources corresponding to each physical sidelink transmission channel resource in a group of physical sidelink transmission channel resources, where the physical sidelink transmission channel resource includes a physical sidelink shared channel PSSCH resource and/or a physical sidelink control channel PSCCH resource; set an index number for each physical sidelink transmission channel resource in the group of physical sidelink transmission channel resources according to a first preset order of a first resource factor; set index numbers for the group of PSFCH resources according to a second preset order of a second resource factor; and configure a mapping relationship between index numbers of the physical sidelink transmission channel resources and index numbers of PSFCH resources corresponding to the physical sidelink transmission channel resources.

In this embodiment of this disclosure, a group of PSFCH resources corresponding to each physical sidelink transmission channel resource in a group of physical sidelink transmission channel resources is obtained, index numbers are set for the group of physical sidelink transmission channel resources according to a first preset order of a first resource factor, index numbers are set for the group of PSFCH resources according to a second preset order of a second resource factor, and a mapping relationship is established between index numbers of corresponding physical sidelink transmission channel resources and PSFCH resources, so that an implicit mapping relationship is established between the physical sidelink transmission channel resources and the PSFCH resources. This provides a reference for selecting a PSFCH resource for transmitting feedback information, and can reduce or even avoid collision on a PSFCH resource on which a plurality of pieces of feedback information are transmitted.

In FIG. 9, a bus architecture may include any number of interconnected buses and bridges, specifically for interconnecting various circuits of one or more processors represented by the processor 502 and a memory represented by the memory 501. The bus architecture may further interconnect various other circuits such as a peripheral device, a voltage regulator, and a power management circuit. These are all well known in the art, and therefore are not further described in this specification. The bus interface provides an interface. The radio frequency unit 503 may be a plurality of components, including a transmitter and a transceiver, and provides units for communicating with a variety of other apparatuses on a transmission medium and receiving and sending data under control of the processor 502. The processor 502 is responsible for management of the bus architecture and general processing, and the memory 501 may store data for use by the processor 502 when the processor 502 performs an operation.

Optionally, an embodiment of this disclosure further provides a network device, including a processor 502, a memory 501, and a computer program stored in the memory 501 and capable of running on the processor 502. When the computer program is executed by the processor 502, the processes of the embodiment of the sidelink resource mapping method that is shown in FIG. 1 and that is applied to the network device are implemented, with the same technical effects achieved. To avoid repetition, details are not described herein again.

A terminal device provided in an embodiment of this disclosure is capable of implementing the processes implemented by the terminal device in the method embodiment of FIG. 4. To avoid repetition, details are not described herein again.

Figure 10:
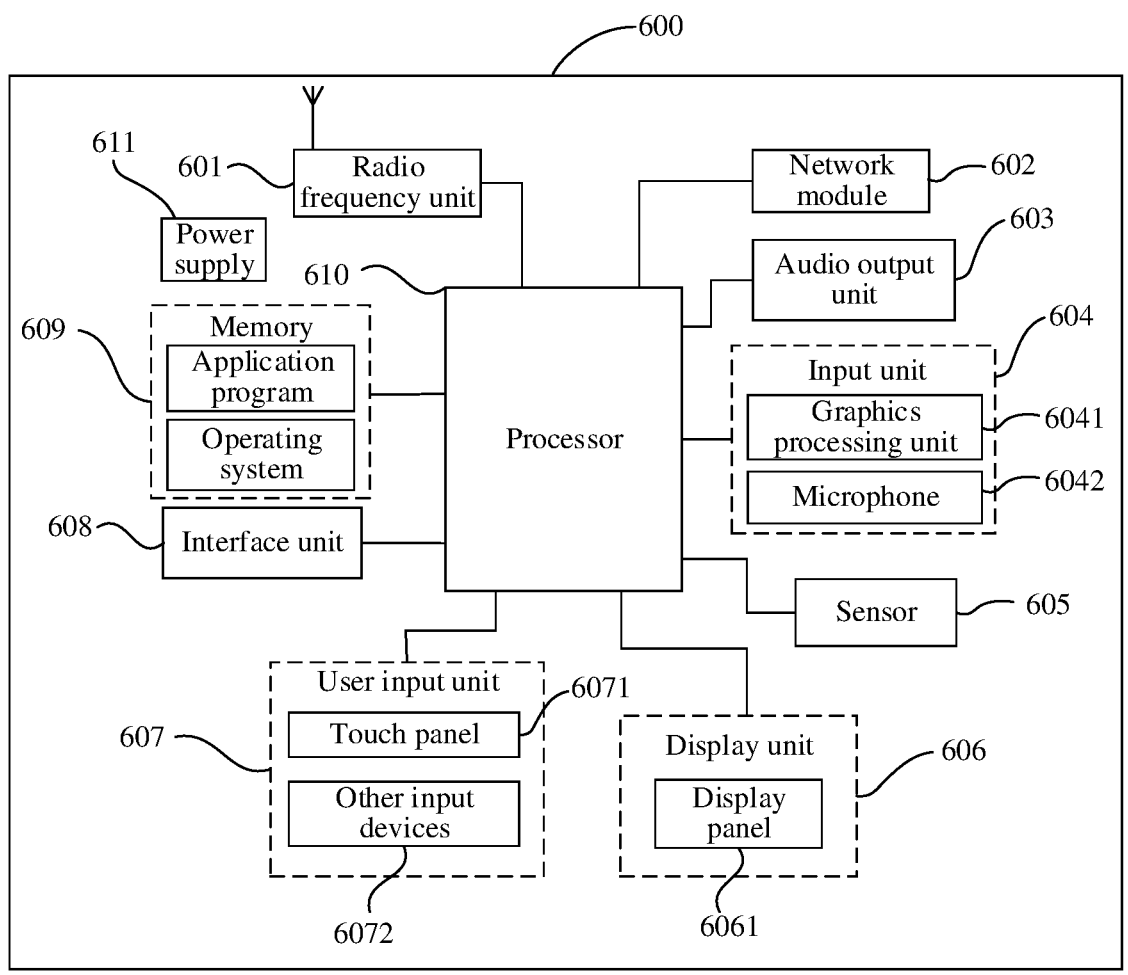
FIG. 10 is a schematic diagram of a hardware structure of a terminal device for implementing the embodiments of this disclosure.

FIG. 10 is a schematic diagram of a hardware structure of a terminal device for implementing the embodiments of this disclosure. The terminal device 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art can understand that the terminal device structure shown in FIG. 10 does not constitute a limitation on the terminal device. The terminal device may include more or fewer components than those shown in the figure, or some components may be combined, or there may be a different component layout. In this embodiment of this disclosure, the terminal device includes but is not limited to a mobile phone, a tablet computer, a laptop computer, a palmtop computer, an in-vehicle terminal, a wearable device, a pedometer, and the like.

The processor 610 is configured to, based on an index number of a target physical sidelink transmission channel resource, obtain from a preset mapping relationship an index number of a PSFCH resource that corresponds to the index number of the target physical sidelink transmission channel resource.

The radio frequency unit 601 is configured to transmit feedback information on a target PSFCH resource. The index number of the PSFCH resource that corresponds to the index number of the target physical sidelink transmission channel resource includes an index number of the target PSFCH resource.

The preset mapping relationship includes a preconfigured mapping relationship between index numbers of PSFCH resources and index numbers of physical sidelink transmission channel resources. The index numbers of the physical sidelink transmission channel resources are set according to a first preset order of a first resource factor. The index numbers of the PSFCH resources are set according to a second preset order of a second resource factor. The target physical sidelink transmission channel resource is a physical sidelink transmission channel resource corresponding to received information.

In this embodiment of this disclosure, the target PSFCH resource corresponding to the target physical sidelink transmission channel resource may be searched for by using the mapping relationship preset by the network device, and the feedback information is transmitted on the target PSFCH resource. The preset mapping relationship provides an implicit mapping relationship between physical sidelink transmission channel resources and PSFCH resources. The target PSFCH resource occupied for transmitting the feedback information may be selected based on a specific preset mapping relationship, thereby reducing or even avoiding collision on a PSFCH resource on which a plurality of pieces of feedback information are transmitted.

It should be understood that, in this embodiment of this disclosure, the radio frequency unit 601 may be configured to transmit or receive a signal in an information transmitting/receiving or call process. Specifically, the radio frequency unit 601 receives downlink data from a base station and transmits the downlink data to the processor 610 for processing; and transmits uplink data to the base station. Usually, the radio frequency unit 601 includes but is not limited to an antenna, at least one amplifier, a transceiver, a coupler, a low noise amplifier, a duplexer, and the like. In addition, the radio frequency unit 601 may further communicate with a network and another device by using a wireless communications system.

The terminal device provides the user with wireless broadband Internet access by using the network module 602, for example, helping the user send or receive an email, browse a web page, and access streaming media.

The audio output unit 603 may convert audio data received by the radio frequency unit 601 or the network module 602 or stored in the memory 609 into an audio signal and output the audio signal as a sound. In addition, the audio output unit 603 may further provide audio output (for example, a call signal received sound or a message received sound) related to a specific function performed by the terminal device 600. The audio output unit 603 includes a speaker, a buzzer, a receiver, and the like.

The input unit 604 is configured to receive an audio or video signal. The input unit 604 may include a graphics processing unit (GPU) 6041 and a microphone 6042. The graphics processing unit 6041 processes image data of a static picture or a video that is obtained by an image capture apparatus (for example, a camera) in a video capture mode or an image capture mode. A processed image frame may be displayed on the display unit 606. The image frame processed by the graphics processing unit 6041 may be stored in the memory 609 (or another storage medium) or transmitted by the radio frequency unit 601 or the network module 602. The microphone 6042 may receive sounds and process such sounds into audio data. The processed audio data may be converted in a telephone call mode into a format that can be transmitted by the radio frequency unit 601 to a mobile communications base station, for outputting.

The terminal device 600 further includes at least one sensor 605, for example, an optical sensor, a motion sensor, and other sensors. Specifically, the optical sensor includes an ambient light sensor and a proximity sensor. The ambient light sensor may adjust brightness of a display panel 6061 based on intensity of ambient light. When the terminal device 600 moves to an ear, the proximity sensor may turn off the display panel 6061 and/or backlight. As a motion sensor, an accelerometer sensor may detect magnitudes of accelerations in all directions (usually three axes), may detect a magnitude and a direction of gravity when the terminal device is still, and may be applied to posture recognition (for example, landscape/portrait mode switching, a related game, or magnetometer posture calibration) of the terminal device, a function related to vibration recognition (for example, a pedometer or a keystroke), or the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 is configured to display information input by the user or information provided for the user. The display unit 606 may include the display panel 6061, and the display panel 6061 may be configured in a form of a liquid crystal display (LCD), an organic light-emitting diode (OLED), or the like.

The user input unit 607 may be configured to receive input digital or character information and generate key signal input related to user setting and function control of the terminal device. Specifically, the user input unit 607 includes a touch panel 6071 and other input devices 6072. The touch panel 6071, also referred to as a touchscreen, may collect a touch operation performed by a user on or near the touch panel 6071 (for example, an operation performed by the user on the touch panel 6071 or near the touch panel 6071 by using a finger or any appropriate object or accessory such as a stylus). The touch panel 6071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 610, receives a command transmitted by the processor 610, and executes the command In addition, the touch panel 6071 may be implemented in a plurality of types, for example, a resistive type, a capacitive type, an infrared type, and a surface acoustic wave type. In addition to the touch panel 6071, the user input unit 607 may further include the other input devices 6072. Specifically, the other input devices 6072 may include but are not limited to a physical keyboard, a function key (such as a volume control key or an on/off key), a trackball, a mouse, and a joystick. Details are not described herein.

Further, the touch panel 6071 may cover the display panel 6061. After detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. In FIG. 10, the touch panel 6071 and the display panel 6061 serve as two separate components to implement input and output functions of the terminal device. However, in some embodiments, the touch panel 6071 and the display panel 6061 may be integrated to implement the input and output functions of the terminal device. This is not specifically limited herein.

The interface unit 608 is an interface connecting an external apparatus to the terminal device 600. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 608 may be configured to receive input (for example, data information and electric power) from the external apparatus, and transmit the received input to one or more elements in the terminal device 600; or may be configured to transmit data between the terminal device 600 and the external apparatus.

The memory 609 may be configured to store software programs and various data. The memory 609 may mainly include a program storage region and a data storage region. The program storage region may store an operating system, an application program required by at least one function (for example, an audio play function or an image play function), and the like. The data storage region may store data (for example, audio data or a phone book) created based on usage of the mobile phone. In addition, the memory 609 may include a high-speed random access memory, or may include a nonvolatile memory, for example, at least one magnetic disk storage device or a flash memory device, or other volatile solid-state storage device.

The processor 610 is a control center of the terminal device, and is connected to all components of the terminal device by using various interfaces and lines. By running or executing a software program and/or module that is stored in the memory 609 and calling data stored in the memory 609, the processor 610 executes various functions of the terminal device and processes data, so as to perform overall monitoring on the terminal device. The processor 610 may include one or more processing units. Optionally, the processor 610 may integrate an application processor and a modem processor. The application processor mainly processes an operating system, a user interface, an application program, and the like. The modem processor mainly processes wireless communication. It can be understood that the modem processor may be alternatively not integrated in the processor 610.

The terminal device 600 may further include the power supply 611 (for example, a battery) that supplies power to each component. Optionally, the power supply 611 may be logically connected to the processor 610 by using a power management system, so as to implement functions such as charging management, discharging management, and power consumption management by using the power management system.

In addition, the terminal device 600 includes some functional modules that are not shown. Details are not described herein.

Optionally, an embodiment of this disclosure further provides a terminal device, including a processor 610, a memory 609, and a computer program stored in the memory 609 and capable of running on the processor 610. When the computer program is executed by the processor 610, the processes of the embodiment of the sidelink resource transmission method are implemented, with the same technical effects achieved. To avoid repetition, details are not described herein again.

An embodiment of this disclosure further provides a computer-readable storage medium. The computer-readable storage medium stores a computer program. When the computer program is executed by a processor, the processes of the embodiment of the sidelink resource transmission method applied to the terminal device or the embodiment of the sidelink resource mapping method applied to the network device are implemented, with the same technical effects achieved. To avoid repetition, details are not described herein again. The computer-readable storage medium may include a read-only memory (ROM for short), a random access memory (RAM for short), a magnetic disk, or an optical disc.

The sidelink resource transmission method, the network device, the terminal device, and the storage medium in the foregoing embodiments may be applied to a 5G communications system and subsequent communications systems. This is not limited herein.

The embodiments in this specification are described in a progressive manner. For a part that is the same or similar between different embodiments, reference may be made between the embodiments. Each embodiment focuses on differences from other embodiments. For related content of the embodiment of the terminal device, the embodiment of the network device, and the embodiment of the computer-readable storage medium, refer to the descriptions of the method embodiments.

It should be noted that, in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or a part contributing to the prior art may be implemented in a form of a software product. The computer software product is stored in a storage medium (for example, a ROM/RAM, a magnetic disc, or an optical disc), and includes several instructions for instructing a terminal (which may be a mobile phone, a computer, a server, an air conditioner, a network device, or the like) to perform the methods described in the embodiments of this disclosure.

Various aspects of this disclosure are described above with reference to the flowcharts and/or the block diagrams of the method, the apparatus (systems), and the computer program product in the embodiments of this disclosure. It should be understood that each block in the flowcharts and/or the block diagrams and a combination of blocks in the flowcharts and/or the block diagrams may be implemented by programs or instructions. These programs or instructions may be provided for a processor of a general-purpose computer, a dedicated computer, or another programmable data processing apparatus to generate a machine, so that these programs or instructions executed by the processor of the computer or the another programmable data processing apparatus implement a specific function/action in one or more blocks in the flowcharts and/or the block diagrams. The processor may be but is not limited to a general-purpose processor, a dedicated processor, a special application processor, or a field programmable logic circuit. It can be further understood that each block in the flowcharts and/or the block diagrams and a combination of blocks in the flowcharts and/or the block diagrams may be alternatively implemented by dedicated hardware that performs a specific function or action, or may be implemented by a combination of dedicated hardware and computer instructions.

The foregoing describes the embodiments of this disclosure with reference to the accompanying drawings. However, this disclosure is not limited to the foregoing specific implementations. The foregoing specific implementations are merely illustrative rather than restrictive. As instructed by this disclosure, a person of ordinary skill in the art may develop many other manners without departing from principles of this disclosure and the protection scope of the claims, and all such manners fall within the protection scope of this disclosure.

What is claimed is:

1. A sidelink resource transmission method, comprising:
based on an index number of a target physical sidelink transmission channel resource, obtaining, by a terminal device, from a preset mapping relationship an index number of a physical sidelink feedback channel (PSFCH) resource that corresponds to the index number of the target physical sidelink transmission channel resource; and
transmitting feedback information on a target PSFCH resource, wherein the PSFCH resource comprises the target PSFCH resource, and the index number of the PSFCH resource that corresponds to the index number of the target physical sidelink transmission channel resource comprises an index number of the target PSFCH resource, wherein
the preset mapping relationship comprises a preconfigured mapping relationship between index numbers of PSFCH resources and index numbers of physical sidelink transmission channel resources, the index numbers of the physical sidelink transmission channel resources are set according to a first preset order of a first resource factor, the index numbers of the PSFCH resources are set according to a second preset order of a second resource factor, and the target physical sidelink transmission channel resource is a physical sidelink transmission channel resource corresponding to received information;
wherein the preset mapping relationship is used for the terminal device to select the target PSFCH resource whose index number corresponds to the index number of the target physical sidelink transmission channel resource;
wherein the first resource factor comprises a time-domain factor and/or a frequency-domain factor; and
in a case that the first resource factor comprises the time-domain factor, the first preset order comprises an ascending order of time-domain unit numbers or a descending order of the time-domain unit numbers;
or
in a case that the first resource factor comprises the frequency-domain factor, the first preset order comprises an ascending order of frequency-domain unit numbers or a descending order of the frequency-domain unit numbers;
or
in a case that the first resource factor comprises the time-domain factor and the frequency-domain factor, the first preset order comprises the ascending order of the frequency-domain unit numbers or the descending order of the frequency-domain unit numbers on a basis of the ascending order of the time-domain unit numbers or the descending order of the time-domain unit numbers;
or
in a case that the first resource factor comprises the time-domain factor and the frequency-domain factor, the first preset order comprises the ascending order of the time-domain unit numbers or the descending order of the time-domain unit numbers on a basis of the ascending order of the frequency-domain unit numbers or the descending order of the frequency-domain unit numbers;
wherein the second resource factor comprises a frequency-domain factor and/or a code-domain factor; and
in a case that the second resource factor comprises the frequency-domain factor, the second preset order comprises an ascending order of frequency-domain unit numbers or a descending order of the frequency-domain unit numbers;
or in a case that the second resource factor comprises the code-domain factor, the second preset order comprises an ascending order of extremum numbers corresponding to a code sequence or a descending order of the extremum numbers corresponding to the code sequence, wherein the extremum numbers comprise the smallest number and/or the largest number;

or in a case that the second resource factor comprises the frequency-domain factor and the code-domain factor, the second preset order comprises the ascending order of the extremum numbers corresponding to the code sequence or the descending order of the extremum numbers corresponding to the code sequence on a basis of the ascending order of the frequency-domain unit numbers or the descending order of the frequency-domain unit numbers;

or in a case that the second resource factor comprises the frequency-domain factor and the code-domain factor, the second preset order comprises the ascending order of the frequency-domain unit numbers or the descending order of the frequency-domain unit numbers on a basis of the ascending order of the extremum numbers corresponding to the code sequence or the descending order of the extremum numbers corresponding to the code sequence.

2. The method according to claim 1, wherein the target physical sidelink transmission channel resource is a physical sidelink transmission channel resource with any frequency-domain unit number among physical sidelink transmission channel resources corresponding to the received information;

or the target physical sidelink transmission channel resource is a physical sidelink transmission channel resource with the largest frequency-domain unit number among physical sidelink transmission channel resources corresponding to the received information;

or the target physical sidelink transmission channel resource is a physical sidelink transmission channel resource with the smallest frequency-domain unit number among physical sidelink transmission channel resources corresponding to the received information;

or the target physical sidelink transmission channel resource is a physical sidelink transmission channel resource whose frequency-domain unit number is closest to an average value of frequency-domain unit numbers among physical sidelink transmission channel resources corresponding to the received information;

or the target physical sidelink transmission channel resource is a physical sidelink transmission channel resource with the largest index number among physical sidelink transmission channel resources corresponding to the received information;

or the target physical sidelink transmission channel resource is a physical sidelink transmission channel resource with the smallest index number among physical sidelink transmission channel resources corresponding to the received information.

3. The method according to claim 1, wherein in a case that unicast transmission is performed on the target physical sidelink transmission channel resource, the number of PSFCH resources that correspond to the index number of the target physical sidelink transmission channel resource in the preset mapping relationship is S1, and the index number of the target PSFCH resource comprises S2 index numbers of PSFCH resources that correspond to the index number of the target physical sidelink transmission channel resource in the preset mapping relationship, wherein S1 is a positive integer, and S2 is a positive integer less than or equal to S1.

4. The method according to claim 3, wherein the index number of the target PSFCH resource comprises at least an index number of the $n1^{th}$ PSFCH resource that corresponds to the index number of the target physical sidelink transmission channel resource in the preset mapping relationship, wherein n1=[device identification code] mod [S1], and the device identification code is a device identification code of the terminal device related to the transmission of the feedback information.

5. The method according to claim 4, wherein the device identification code comprises one of the following:

at least a part of an identifier of the terminal device, at least a part of a groupcast identifier of the terminal device, at least a part of an identifier of a transmit terminal device corresponding to the terminal device, a spliced code that comprises at least a part of the identifier of the terminal device and at least a part of the identifier of the transmit terminal device corresponding to the terminal device, and a spliced code that comprises at least a part of the groupcast identifier of the terminal device and at least a part of the identifier of the transmit terminal device corresponding to the terminal device.

6. The method according to claim 1, wherein in a case that groupcast transmission is performed on the target physical sidelink transmission channel resource and the terminal device and another terminal device occupy the same PSFCH resource, the number of index numbers of PSFCH resources that correspond to the index number of the target physical sidelink transmission channel resource in the preset mapping relationship is S3, and the index number of the target PSFCH resource is an index number of a PSFCH resource that corresponds to the index number of the target physical sidelink transmission channel resource in the preset mapping relationship, wherein S3 is a positive integer.

7. The method according to claim 6, wherein in a case that S3 is greater than 1, the index number of the target PSFCH resource is an index number of the $n2^{th}$ PSFCH resource that corresponds to the index number of the target physical sidelink transmission channel resource in the preset mapping relationship, wherein n2=[device identification code] mod [S3], and the device identification code is a device identification code of the terminal device related to the transmission of the feedback information.

8. The method according to claim 1, wherein in a case that groupcast transmission is performed on the target physical sidelink transmission channel resource and the terminal device and another terminal device occupy different PSFCH resources, the number of index numbers of PSFCH resources that correspond to the index number of the target physical sidelink transmission channel resource in the preset mapping relationship is S4, the index number of the target PSFCH resource is an index number of the n3th PSFCH resource that corresponds to the index number of the target physical sidelink transmission channel resource in the preset mapping relationship, and n3= [first device identification code] mod [S4], wherein S4 is a positive integer, and the first device identification code is a device identification code of the terminal device related to the transmission of the feedback information.

9. The method according to claim 1, wherein in a case that groupcast transmission is performed on the target physical sidelink transmission channel resource and the terminal device and another terminal device occupy different PSFCH resources,
the number of index numbers of PSFCH resources that correspond to the index number of the target physical sidelink transmission channel resource in the preset mapping relationship is S5, the index number of the target PSFCH resource is an index number of the $n4^{th}$ PSFCH resource that corresponds to the index number of the target physical sidelink transmission channel resource in the preset mapping relationship, and n4= ([first device identification code] mod [S5])×Y+[second device identification code] mod [Y], wherein
S5 is a positive integer, Y is a configuration parameter, Y is a positive integer, the first device identification code is a device identification code of the terminal device related to the transmission of the feedback information, and the second device identification code is a device identification code of the terminal device related to the transmission of the feedback information.

10. The method according to claim 1, wherein
a first PSFCH resource set, a second PSFCH resource set, and a third PSFCH resource set are the same;
or
the first PSFCH resource set is the same as the second PSFCH resource set, and the first PSFCH resource set is different from the third PSFCH resource set;
or
the first PSFCH resource set is the same as the third PSFCH resource set, and the first PSFCH resource set is different from the second PSFCH resource set;
or
the first PSFCH resource set, the second PSFCH resource set, and the third PSFCH resource set are different from each other, wherein
the first PSFCH resource set comprises a PSFCH resource that is occupied by unicast transmission and whose index number corresponds to the index number of the target physical sidelink transmission channel resource in the preset mapping relationship, the second PSFCH resource comprises a PSFCH resource that is jointly occupied by terminal devices in groupcast transmission and whose index number corresponds to the index number of the target physical sidelink transmission channel resource in the preset mapping relationship, and the third PSFCH resource set comprises a PSFCH resource that is occupied by each terminal device in groupcast transmission and whose index number corresponds to the index number of the target physical sidelink transmission channel resource in the preset mapping relationship.

11. A network device, comprising a processor, a memory, and a computer program stored in the memory and capable of running on the processor, wherein the computer program, when executed by the processor of the network device, causes the network device to perform:

obtaining a group of physical sidelink feedback channel (PSFCH) resources corresponding to each physical sidelink transmission channel resource in a group of physical sidelink transmission channel resources, wherein the physical sidelink transmission channel resource comprises at least one of a physical sidelink shared channel (PSSCH) resource or a physical sidelink control channel (PSCCH) resource;
setting an index number for each physical sidelink transmission channel resource in the group of physical sidelink transmission channel resources according to a first preset order of a first resource factor;
setting index numbers for the group of PSFCH resources according to a second preset order of a second resource factor; and
configuring a mapping relationship between index numbers of the physical sidelink transmission channel resources and index numbers of PSFCH resources corresponding to the physical sidelink transmission channel resources;
wherein the mapping relationship is used for a terminal device to select a target PSFCH resource whose index number corresponds to an index number of a target physical sidelink transmission channel resource, and the PSFCH resources comprise the target PSFCH resource;
wherein the first resource factor comprises a time-domain factor and/or a frequency-domain factor; and
in a case that the first resource factor comprises the time-domain factor, the first preset order comprises an ascending order of time-domain unit numbers or a descending order of the time-domain unit numbers;
or
in a case that the first resource factor comprises the frequency-domain factor, the first preset order comprises an ascending order of frequency-domain unit numbers or a descending order of the frequency-domain unit numbers;
or
in a case that the first resource factor comprises the time-domain factor and the frequency-domain factor, the first preset order comprises the ascending order of the frequency-domain unit numbers or the descending order of the frequency-domain unit numbers on a basis of the ascending order of the time-domain unit numbers or the descending order of the time-domain unit numbers;
or
in a case that the first resource factor comprises the time-domain factor and the frequency-domain factor, the first preset order comprises the ascending order of the time-domain unit numbers or the descending order of the time-domain unit numbers on a basis of the ascending order of the frequency-domain unit numbers or the descending order of the frequency-domain unit numbers;
wherein the second resource factor comprises a frequency-domain factor and/or a code-domain factor; and
in a case that the second resource factor comprises the frequency-domain factor, the second preset order comprises an ascending order of frequency-domain unit numbers or a descending order of the frequency-domain unit numbers;
or
in a case that the second resource factor comprises the code-domain factor, the second preset order comprises an ascending order of extremum numbers corresponding to a code sequence or a descending order of the extremum numbers corresponding to the code sequence, wherein the extremum numbers comprise the smallest number and/or the largest number; or in a case that the second resource factor comprises the frequency-domain factor and the code-domain factor, the second preset order comprises the ascending order of the extremum numbers corresponding to the code sequence or the descending order of the extremum numbers corresponding to the code sequence on a basis of the ascending order of the frequency-domain unit numbers or the descending order of the frequency-domain unit numbers;

or in a case that the second resource factor comprises the frequency-domain factor and the code-domain factor, the second preset order comprises the ascending order of the frequency-domain unit numbers or the descending order of the frequency-domain unit numbers on a basis of the ascending order of the extremum numbers corresponding to the code sequence or the descending order of the extremum numbers corresponding to the code sequence.

12. The network device according to claim 11, wherein the number of physical sidelink transmission channel resources in the group of physical sidelink transmission channel resources is P, wherein P is a positive integer; and the configuring a mapping relationship between index numbers of the physical sidelink transmission channel resources and index numbers of PSFCH resources corresponding to the physical sidelink transmission channel resources comprises:

configuring a mapping relationship between an index number of the $i^{th}$ physical sidelink transmission channel resource and index numbers of the $((i-1) \times N+1)^{th}$ to the $(i \times N)^{th}$ PSFCH resources, wherein each physical sidelink transmission channel resource corresponds to N PSFCH resources, N is a positive integer, i is a non-negative integer, and $1 \leq i \leq P$.

13. A terminal device, comprising a processor, a memory, and a computer program stored in the memory and capable of running on the processor, wherein the computer program, when executed by the processor of the terminal device, causes the terminal device to perform:

based on an index number of a target physical sidelink transmission channel resource, obtaining from a preset mapping relationship an index number of a physical sidelink feedback channel (PSFCH) resource that corresponds to the index number of the target physical sidelink transmission channel resource; and transmitting feedback information on a target PSFCH resource, wherein the PSFCH resource comprises the target PSFCH resource, and the index number of the PSFCH resource that corresponds to the index number of the target physical sidelink transmission channel resource comprises an index number of the target PSFCH resource, wherein the preset mapping relationship comprises a preconfigured mapping relationship between index numbers of PSFCH resources and index numbers of physical sidelink transmission channel resources, the index numbers of the physical sidelink transmission channel resources are set according to a first preset order of a first resource factor, the index numbers of the PSFCH resources are set according to a second preset order of a second resource factor, and the target physical sidelink transmission channel resource is a physical sidelink transmission channel resource corresponding to received information;

wherein the preset mapping relationship is used for the terminal device to select the target PSFCH resource whose index number corresponds to the index number of the target physical sidelink transmission channel resource;

wherein the first resource factor comprises a time-domain factor and/or a frequency-domain factor; and in a case that the first resource factor comprises the time-domain factor, the first preset order comprises an ascending order of time-domain unit numbers or a descending order of the time-domain unit numbers;

or in a case that the first resource factor comprises the frequency-domain factor, the first preset order comprises an ascending order of frequency-domain unit numbers or a descending order of the frequency-domain unit numbers;

or in a case that the first resource factor comprises the time-domain factor and the frequency-domain factor, the first preset order comprises the ascending order of the frequency-domain unit numbers or the descending order of the frequency-domain unit numbers on a basis of the ascending order of the time-domain unit numbers or the descending order of the time-domain unit numbers;

or in a case that the first resource factor comprises the time-domain factor and the frequency-domain factor, the first preset order comprises the ascending order of the time-domain unit numbers or the descending order of the time-domain unit numbers on a basis of the ascending order of the frequency-domain unit numbers or the descending order of the frequency-domain unit numbers;

wherein the second resource factor comprises a frequency-domain factor and/or a code-domain factor; and in a case that the second resource factor comprises the frequency-domain factor, the second preset order comprises an ascending order of frequency-domain unit numbers or a descending order of the frequency-domain unit numbers;

or in a case that the second resource factor comprises the code-domain factor, the second preset order comprises an ascending order of extremum numbers corresponding to a code sequence or a descending order of the extremum numbers corresponding to the code sequence, wherein the extremum numbers comprise the smallest number and/or the largest number;

or in a case that the second resource factor comprises the frequency-domain factor and the code-domain factor, the second preset order comprises the ascending order of the extremum numbers corresponding to the code sequence or the descending order of the extremum numbers corresponding to the code sequence on a basis of the ascending order of the frequency-domain unit numbers or the descending order of the frequency-domain unit numbers;

or in a case that the second resource factor comprises the frequency-domain factor and the code-domain factor, the second preset order comprises the ascending order of the frequency-domain unit numbers or the descending order of the frequency-domain unit numbers on a basis of the ascending order of the extremum numbers corresponding to the code sequence or the descending order of the extremum numbers corresponding to the code sequence.

14. The terminal device according to claim 13, wherein in a case that unicast transmission is performed on the target physical sidelink transmission channel resource, the number of PSFCH resources that correspond to the index number of the target physical sidelink transmission channel resource in the preset mapping relationship is S1, and the index number of the target PSFCH resource comprises S2 index numbers of PSFCH resources that correspond to the index number of the target physical sidelink transmission channel resource in the preset mapping relationship, wherein S1 is a positive integer, and S2 is a positive integer less than or equal to S1.

15. The terminal device according to claim 14, wherein, the index number of the target PSFCH resource comprises at least an index number of the $n1^{th}$ PSFCH resource that corresponds to the index number of the target physical sidelink transmission channel resource in the preset mapping relationship, wherein n1=[device identification code] mod [S1], and the device identification code is a device identification code of the terminal device related to the transmission of the feedback information.

16. The terminal device according to claim 13, wherein in a case that groupcast transmission is performed on the target physical sidelink transmission channel resource and the terminal device and another terminal device occupy the same PSFCH resource, the number of index numbers of PSFCH resources that correspond to the index number of the target physical sidelink transmission channel resource in the preset mapping relationship is S3, and the index number of the target PSFCH resource is an index number of a PSFCH resource that corresponds to the index number of the target physical sidelink transmission channel resource in the preset mapping relationship, wherein S3 is a positive integer.

17. The terminal device according to claim 16, wherein, in a case that S3 is greater than 1, the index number of the target PSFCH resource is an index number of the $n2^{th}$ PSFCH resource that corresponds to the index number of the target physical sidelink transmission channel resource in the preset mapping relationship, wherein n2=[device identification code] mod [S3], and the device identification code is a device identification code of the terminal device related to the transmission of the feedback information.

18. The terminal device according to claim 13, wherein in a case that groupcast transmission is performed on the target physical sidelink transmission channel resource and the terminal device and another terminal device occupy different PSFCH resources, the number of index numbers of PSFCH resources that correspond to the index number of the target physical sidelink transmission channel resource in the preset mapping relationship is S4, the index number of the target PSFCH resource is an index number of the $n3^{th}$ PSFCH resource that corresponds to the index number of the target physical sidelink transmission channel resource in the preset mapping relationship, and n3=[first device identification code] mod [S4], wherein S4 is a positive integer, and the first device identification code is a device identification code of the terminal device related to the transmission of the feedback information.

* * * * *